(12) United States Patent
Sugawara

(10) Patent No.: US 12,289,674 B2
(45) Date of Patent: Apr. 29, 2025

(54) USER EQUIPMENT (UE)

(71) Applicant: SHARP KABUSHIKI KAISHA, Osaka (JP)

(72) Inventor: Yasuo Sugawara, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 304 days.

(21) Appl. No.: 17/789,125

(22) PCT Filed: Dec. 24, 2020

(86) PCT No.: PCT/JP2020/048539
§ 371 (c)(1),
(2) Date: Jun. 24, 2022

(87) PCT Pub. No.: WO2021/132506
PCT Pub. Date: Jul. 1, 2021

(65) Prior Publication Data
US 2023/0053127 A1 Feb. 16, 2023

(30) Foreign Application Priority Data
Dec. 27, 2019 (JP) ................. 2019-238126

(51) Int. Cl.
H04W 24/04 (2009.01)
H04W 28/10 (2009.01)
H04W 48/18 (2009.01)

(52) U.S. Cl.
CPC .......... *H04W 48/18* (2013.01); *H04W 24/04* (2013.01); *H04W 28/10* (2013.01)

(58) Field of Classification Search
CPC ...... H04W 24/04; H04W 28/10; H04W 48/18
See application file for complete search history.

(56) References Cited

U.S. PATENT DOCUMENTS

2019/0029065 A1* 1/2019 Park .................. H04W 8/08
2019/0200285 A1* 6/2019 Velev ................ H04W 8/02
(Continued)

FOREIGN PATENT DOCUMENTS

CN 109951877 A 6/2019

OTHER PUBLICATIONS

3GPP TS 23.501 V16.3.0 (Dec. 2019) 3rd Generation Partnership Project; Technical Specification Group Services and System Aspects; System architecture for the 5G System (5GS); Stage 2 (Release 16).
(Continued)

*Primary Examiner* — Alpus Hsu
(74) *Attorney, Agent, or Firm* — ScienBiziP, P.C.

(57) ABSTRACT

A User Equipment (UE) comprises control circuitry and transmission and reception circuitry. The transmission and reception circuitry is configured to receive, from an Access and Mobility Management Function (AMF), a first configuration update command message including a rejected Network Slice Selection Assistance Information (NSSAI) including a Single Network Slice Selection Assistance Information for which a maximum number of UEs has been reached, a cause value indicating that the S-NSSAI is not available due to the maximum number of UEs being reached, and a back-off timer value for the S-NSSAI. The control circuitry is configured to start a timer with the back-off timer value for the S-NSSAI. The transmission and reception circuitry is further configured not to attempt to use the S-NSSAI while the back-off timer is running.

2 Claims, 8 Drawing Sheets

(56) References Cited

U.S. PATENT DOCUMENTS

| | | | |
|---|---|---|---|
| 2019/0223093 A1* | 7/2019 | Watfa | H04W 36/13 |
| 2019/0261185 A1* | 8/2019 | Velev | H04W 48/18 |
| 2019/0306823 A1* | 10/2019 | Babu | H04W 60/04 |
| 2019/0373441 A1* | 12/2019 | Ryu | H04W 48/18 |
| 2020/0196130 A1* | 6/2020 | Tamura | H04W 8/02 |
| 2020/0322879 A1 | 10/2020 | Zhu et al. | |
| 2020/0367149 A1* | 11/2020 | Kang | H04W 48/06 |
| 2020/0413241 A1* | 12/2020 | Park | H04W 76/22 |
| 2021/0014781 A1* | 1/2021 | Ianev | H04W 48/18 |
| 2021/0051515 A1* | 2/2021 | Huang-Fu | H04W 76/10 |
| 2021/0051516 A1* | 2/2021 | Huang-Fu | H04W 76/10 |
| 2021/0084529 A1* | 3/2021 | Chiba | H04W 28/0268 |

OTHER PUBLICATIONS

3GPP TS 23.502 V16.3.0 (Dec. 2019) Brd Generation Partnership Project; Technical Specification Group Services and System Aspects; Procedures for the 5G System (5GS); Stage 2 (Release 16).

3GPP TS 24.501 V16.3.0 (Dec. 2019) 3rd Generation Partnership Project; Technical Specification Group Core Network and Terminals; Non-Access-Stratum (NAS) protocol for 5G System (5GS); Stage 3 (Release 16).

3GPP TR 23.700-40 V0.2.0 (Dec. 2019) 3rd Generation Partnership Project; Technical Specification Group Services and System Aspects; Study on Enhancement of Network Slicing Phase 2 (Release 17).

* cited by examiner

USER EQUIPMENT (UE)

TECHNICAL FIELD

The present application relates to a User Equipment (UE). This application claims the benefit of priority to JP 2019-238126 filed on Dec. 27, 2019, which is incorporated herein by reference in its entirety.

BACKGROUND ART

The 3rd Generation Partnership Project (3GPP), which undertakes activities for standardizing recent mobile communication systems, has studied System Architecture Evolution (SAE) which is a system architecture of Long Term Evolution (LTE).

Additionally, the 3GPP has recently studied next-generation communication technologies and system architectures for a 5th Generation (5G) mobile communication system which is a next generation mobile communication system, and in particular, has standardized a 5G System (5GS) as a system for realizing a 5G mobile communication system (see NPL 1 and NPL 2). In the 5GS, technical problems attributable to connection of various terminals to a cellular network are extracted to standardize solutions.

CITATION LIST

Non Patent Literature

NPL 1: 3GPP TS 23.501 V16.3.0 (2019-12); 3rd Generation Partnership Project; Technical Specification Group Services and System Aspects; System Architecture for the 5G System; Stage 2 (Release 16)

NPL 2: 3GPP TS 23.502 V16.3.0 (2019-12); 3rd Generation Partnership Project; Technical Specification Group Services and System Aspects; Procedures for the 5G System; Stage 2 (Release 16)

NPL 3: 3GPP TS 24.501 V16.3.0 (2019-12); 3rd Generation Partnership Project; Technical Specification Group Core Network and Terminals; Non-Access-Stratum (NAS) protocol for 5G System (5GS); Stage 3 (Release 16)

NPL 4: 3GPP TR 23.700-40 V0.2.0 (2019-11); 3rd Generation Partnership Project; Technical Specification Group Services and System Aspects; Study on Enhancement of Network Slicing Phase 2 (Release 17)

SUMMARY OF INVENTION

Technical Problem

For the 5G System (5GS), a 5G Core Network (5GCN) corresponding to a new core network has been under study in order to provide a wide variety of services.

In addition, in 5G, a network slice being a logical network that provides specific network functions and specific network characteristics is defined for the sake of a specific service type and a specific group. For example, the network slice may be a logical network that is provided for the sake of a terminal having a low latency function, or may be a logical network that is provided for a sensor terminal used for Internet of Things (IoT).

In 3GPP, in order to study further functions related to the network slice, Enhancement of Network Slicing (eNS) is studied. In addition, in 3GPP, as study of phase 2 of eNS, addition of a function for performing management of the number of UEs allowed for each network slice is studied.

However, an implementation method for satisfying the above requirements has not been clarified.

The present invention is made in the light of the circumstances as described above, and is to provide a method of implementing a function for eNS in the 5GS.

Solution to Problem

A UE according to an embodiment of the present invention is a User Equipment (UE) including: a transmission and/or reception unit; and a controller, wherein the transmission and/or reception unit transmits a PDU session establishment request message including an S-NSSAI and a PDU session ID, and receives a PDU session establishment accept message including the S-NSSAI, the PDU session ID, a first cause value, a first back-off timer value, a first Session-AMBR IE, and a second Session-AMBR IE, the controller establishes a PDU session corresponding to the S-NSSAI, configures a back-off timer corresponding to the S-NSSAI to the first back-off timer value, and applies a data rate indicated by the second Session-AMBR IE to the PDU session while the back-off timer is running, and in a case that the transmission and/or reception unit receives a PDU session modification command including the PDU session ID, a second cause value, a second back-off timer value, and a third Session-AMBR IE before expiration of the back-off timer, the controller, in a case that the second back-off timer value indicates other than zero, updates the back-off timer to the second back-off timer value, applies the data rate indicated by the third Session-AMBR IE to the PDU session, and updates, in a case that the back-off timer expires, the data rate applied to the PDU session to the data rate indicated by the first Session-AMBR IE, and in a case that the second back-off timer value indicates zero, stops the back-off timer, and updates, in a case that the back-off timer stops, the data rate applied to the PDU session to the data rate indicated by the first Session-AMBR IE.

A UE according to an embodiment of the present invention is a User Equipment (UE) including: a transmission and/or reception unit; and a controller, wherein the transmission and/or reception unit transmits a PDU session establishment request message including an S-NSSAI and a PDU session ID, and receives a PDU session establishment accept message including the S-NSSAI, the PDU session ID, a first cause value, a first back-off timer value, and a second Session-AMBR IE, the controller establishes a PDU session for the S-NSSAI, configures a back-off timer corresponding to the S-NSSAI to the first back-off timer value, and applies a data rate indicated by the second Session-AMBR IE to the PDU session while the BO timer is running, in a case that the transmission and/or reception unit receives a PDU session modification command including the PDU session ID, a second cause value, a second back-off timer value, and a third Session-AMBR IE before expiration of the back-off timer, the controller, in a case that the second back-off timer value indicates other than zero, updates the back-off timer to the second back-off timer value, and applies the data rate indicated by the third Session-AMBR IE to the PDU session, and in a case that the transmission and/or reception unit receives a PDU session modification command including the PDU session ID, a third cause value, and a first Session-AMBR IE before expiration of the back-off timer, the controller stops the back-off timer, the controller updates, in a case that the back-off timer stops, the data rate applied to the PDU session to the data rate indicated by the first Session-AMBR IE.

Advantageous Effects of Invention

According to an aspect of the present invention, in the 5GS, eNS can be supported, and the number of UEs allowed for each network slice can be managed.

DESCRIPTION OF EMBODIMENTS

A preferred embodiment for carrying out the present invention will be described below with reference to the drawings. Note that, as an example, an embodiment of a mobile communication system to which the present invention is applied will be described in the present embodiment.

1. Overview of System

Figure 1:
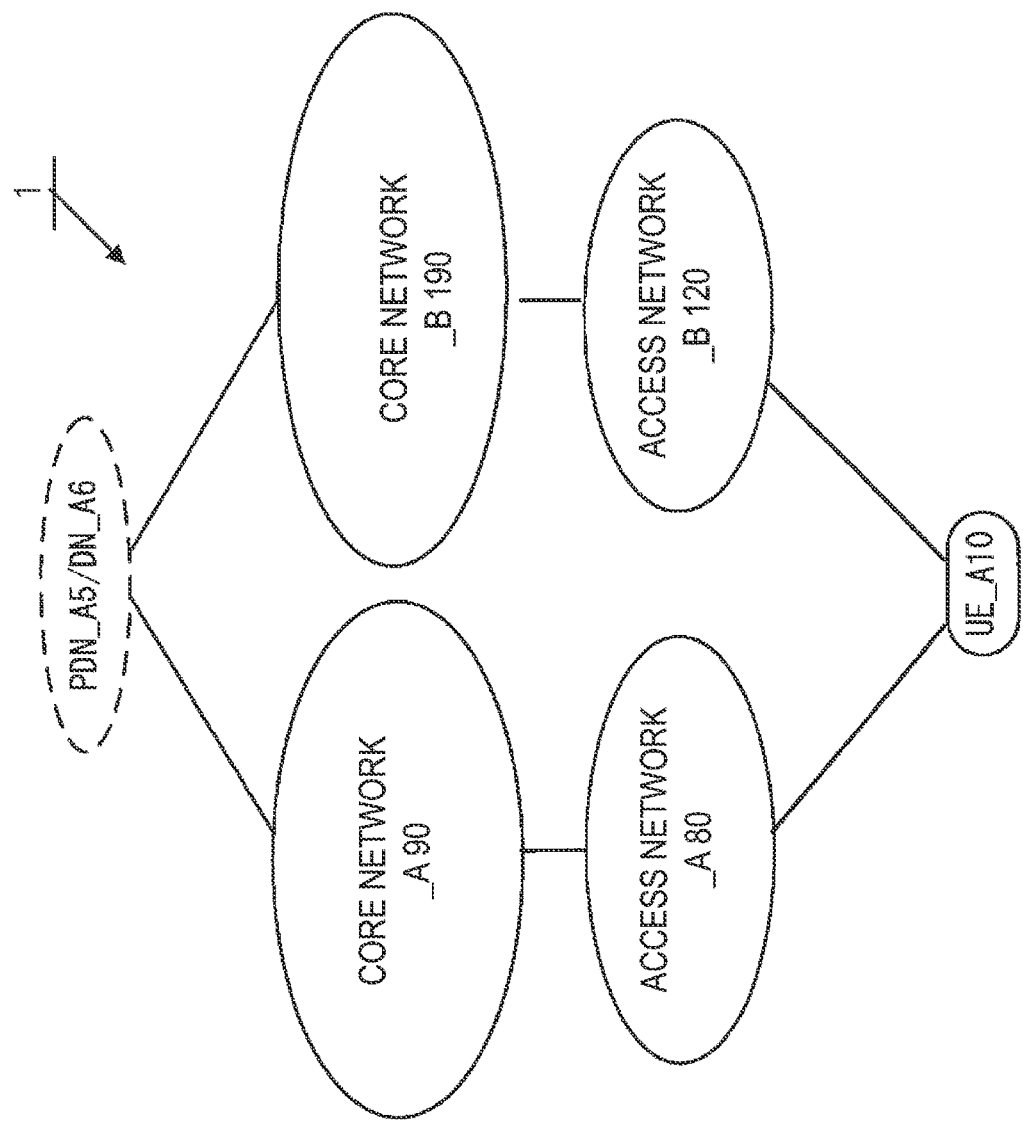
FIG. 1 is a diagram illustrating an overview of a mobile communication system (EPS/5GS).
Figure 2:
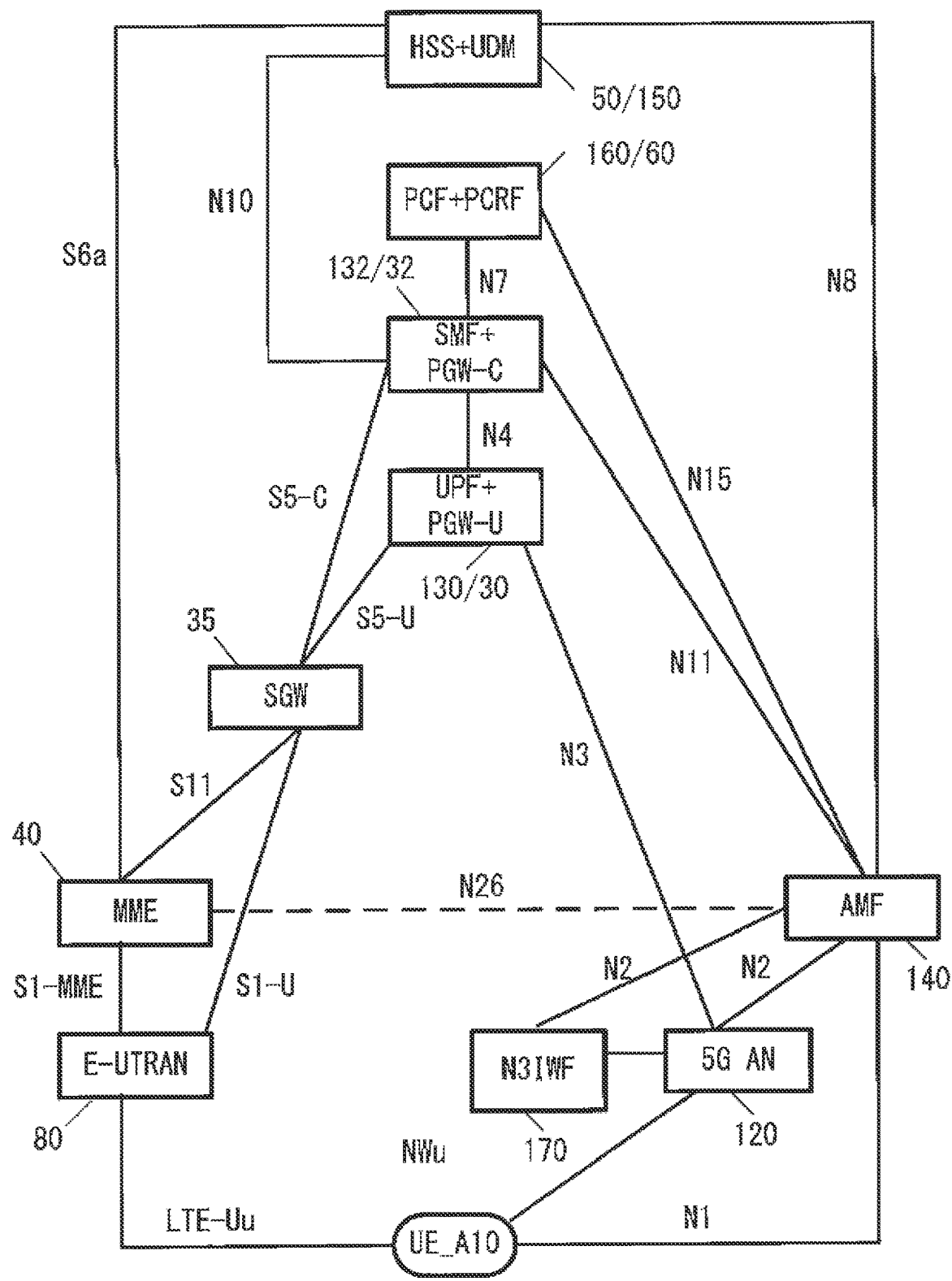
FIG. 2 is a diagram illustrating a detailed configuration of the mobile communication system (EPS/5GS).

First, FIG. 1 is a diagram illustrating an overview of a mobile communication system 1 used in each embodiment, and FIG. 2 is a diagram illustrating a detailed configuration of the mobile communication system 1.

In the illustration of FIG. 1, the mobile communication system 1 includes a UE #A10, an access network #A80, a core network #A90, a Packet Data Network (PDN) #A5, an access network #B120, a core network #B190, and a Data Network (DN) #A6.

In the following description, the symbols may be omitted, such as in a UE, an access network #A, a core network #A, a PDN, an access network #B, a core network #B, and a DN, in regard to these apparatuses and functions.

FIG. 2 illustrates apparatuses and functions such as a UE #A10, an E-UTRAN 80, an MME 40, an SGW 35, a PGW-U 30, a PGW-C 32, a PCRF 60, an HSS 50, a 5G AN 120, an AMF 140, a UPF 130, an SMF 132, a PCF 160, a UDM 150, and an N3IWF 170, and interfaces for connecting these apparatuses and functions to each other.

In the following description, the symbols may be omitted, such as in a UE, an E-UTRAN, an MME, an SGW, a PGW-U, a PGW-C, a PCRF, an HSS, a 5G AN, an AMF, a UPF, an SMF, a PCF, a UDM, and an N3IWF, in regard to these apparatuses and functions.

Note that an Evolved Packet System (EPS) that is a 4G system includes the access network #A and the core network #A and may further include the UE and/or the PDN. A 5G System (5GS) that is a 5G system includes the UE, the access network #B, and the core network #B and may further include the DN.

The UE is an apparatus that can be connected to a network service over 3GPP access (also referred to as a 3GPP access network or a 3GPP AN) and/or non-3GPP access (also referred to as a non-3GPP access network or a non-3GPP AN). The UE may be a terminal apparatus capable of performing radio communication, such as a mobile phone and a smartphone, and may be a terminal apparatus that can be connected to both the EPS and the 5GS. The UE may include a Universal Integrated Circuit Card (UICC) and an Embedded UICC (eUICC). Note that the UE may be referred to as a user equipment or may be referred to as a terminal apparatus.

The access network #A corresponds to an Evolved Universal Terrestrial Radio Access Network (E-UTRAN) and/or a radio LAN access network. In the E-UTRAN, one or more evolved Node Bs (eNBs) 45 are deployed. Note that in the following description, the symbol of the eNB 45 may be omitted such as in an eNB. In a case that there are multiple eNBs, the eNBs are connected to each other via, for example, an X2 interface. In the radio LAN access network, one or more access points are deployed.

The access network #B corresponds to a 5G access network (5G AN). The 5G AN includes an NG Radio Access Network (NG-RAN) and/or a non-3GPP access network. In the NG-RAN, one or more NR NodeBs (gNBs) 122 are deployed. Note that in the following description, the symbol of the gNB 122 may be omitted, such as in an eNB. The gNB is a node that provides a New Radio (NR) user plane and control plane to the UE, and is a node that is connected to a 5GCN via the NG interface (including the N2 interface or the N3 interface). In other words, the gNB is a base station apparatus newly designed for the 5GS and has functions different from those of the base station apparatus (eNB) used in the EPS that is a 4G system. In a case that there are multiple gNBs, the gNBs are connected to each other via, for example, an Xn interface.

Also, a non-3GPP access network may be an untrusted non-3GPP access network or may be a trusted non-3GPP access network. Here, the untrusted non-3GPP access network may be a non-3GPP access network that is an access network in which security management is not performed, such as public wireless LAN, for example. On the other hand, the trusted non-3GPP access network may be an access network defined by 3GPP and may include a trusted non-3GPP access point (TNAP) and a trusted non-3GPP Gateway function (TNGF).

In the following description, the E-UTRAN and the NG-RAN may be referred to as 3GPP access. The radio LAN access network and the non-3GPP AN may be referred to as non-3GPP access. Nodes allocated in the access network #B may also be collectively referred to as NG-RAN nodes.

In the following description, the access network #A, and/or the access network #B, and/or an apparatus included in the access network #A, and/or an apparatus included in the access network #B may be referred to as an access network or an access network apparatus.

The core network #A corresponds to an Evolved Packet Core (EPC). In the EPC, for example, a Mobility Management Entity (MME), a Serving Gateway (SGW), a Packet Data Network Gateway (PGW)-U, a PGW-C, a Policy and Charging Rules Function (PCRF), a Home Subscriber Server (HSS), and the like are deployed.

The core network #B corresponds to a 5G Core Network (5GCN). In the 5GCN, an Access and Mobility Management Function (AMF), a User Plane Function (UPF), a Session Management Function (SMF), a Policy Control Function (PCF), a Unified Data Management (UDM), and the like are deployed. Here, the 5GCN may be referred to as a 5GC.

In the following description, the core network #A, and/or the core network #B, an apparatus included in the core network #A, and/or an apparatus included in the core network #B may be referred to as a core network, a core network apparatus, or an intra-core network apparatus.

The core network (the core network #A and/or the core network #B) may refer to an IP mobile communication network operated by a mobile communication operator (Mobile Network Operator MNO)) connecting the access network (the access network #A and/or the access network #B) and the PDN and/or the DN, may refer to a core network for a mobile communication operator that operates and manages the mobile communication system 1, or may be a core network for a virtual mobile communication operator and a virtual mobile communication service provider such as a Mobile Virtual Network Operator (MVNO) and a Mobile Virtual Network Enabler (MVNE).

FIG. 1 illustrates a case that the PDN and the DN are the same; however the PDN and the DN may be different. The PDN may be a Data Network (DN) that provides communication services for the UE. Note that the DN may be configured as a packet data service network or may be configured for each service. In addition, the PDN may include a connected communication terminal. Thus, "to be connected to the PDN" may mean "to be connected to a communication terminal and a server apparatus deployed in the PDN". In addition, "to transmit and/or receive user data to and/or from the PDN" may mean "to transmit and/or receive user data to and/or from a communication terminal and a server apparatus deployed in the PDN". Note that the PDN may be referred to as a DN, and the DN may be referred to as a PDN.

In the following, at least some of the access network #A, the core network #A, the PDN, the access network #B, the core network #B, and the DN, and/or one or more apparatuses included in these may be referred to as a network or a network apparatus. In other words, the expression that "the network and/or the network apparatus transmits and/or receives a message and/or performs a procedure" means that "at least some of the access network #A, the core network #A, the PDN, the access network #B, the core network #B, and the DN, and/or one or more apparatuses included in these transmit and/or receive a message and/or perform a procedure".

The UE can be connected to the access network. The UE can be connected to the core network over the access network. In addition, the UE can be connected to the PDN or the DN over the access network and the core network. In other words, the UE can transmit and/or receive (communicate) user data to and/or from the PDN or the DN. In a case that user data is transmitted and/or received, not only Internet Protocol (IP) communication but also non-IP communication may be used.

Here, the IP communication refers to data communication using the IP, and data is transmitted and/or received using IP packets. The IP packet includes an IP header and a payload part. In the payload part, data transmitted and/or received by the apparatuses and functions included in the EPS and the apparatuses and functions included in the 5GS may be included. The non-IP communication refers to data communication not using the IP, and data is transmitted and/or received in a form different from the structure of the IP packets. For example, non-IP communication may be data communication implemented through transmission and/or reception of application data not to which an IP header is not added, or user data transmitted and/or received by the UE may be transmitted and/or received with another header such as a MAC header and an Ethernet (trade name) frame header added.

Apparatuses which are not illustrated in FIG. 2 may be configured in the access network #A, the core network #A, the access network #B, the core network #B, the PDN #A, and the DN #A. For example, the core network #A and/or the core network #B may include an Authentication Server Function (AUSF) and an Authentication, authorization, and accounting (AAA) server (AAA-S).

Here, an AUSF is a core network apparatus provided with an authentication function for 3GPP access and non-3GPP access. Specifically, the AUSF is a network function unit that receives an authentication request for 3GPP access and/or non-3GPP access from the UE and performs an authentication procedure.

The AAA server is an apparatus that is connected directly to the AUSF or indirectly to the AUSF via another network apparatus and has authentication, authorization, and billing functions. The AAA server may be a network apparatus within the core network. Note that the AAA server may not be included in the core network #A and/or the core network #B and may be included in the PLMN. In other words, the AAA server may be a core network apparatus or may be an apparatus outside the core network. For example, the AAA server may be a server apparatus within the PLMN managed by a third party.

Note that although each of the apparatuses and functions is illustrated one by one for simple illustration in FIG. 2, multiple similar apparatuses and functions may be configured in the mobile communication system 1. Specifically, multiple apparatuses and functions such as the UE #A10, the E-UTRAN 80, the MME 40, the SGW 35, the PGW-U 30, the PGW-C 32, the PCRF 60, the HSS 50, the 5G AN 120, the AMF 140, the UPF 130, the SMF 132, the PCF 160, and/or the UDM 150 may be configured in the mobile communication system 1.

2. Configuration of Each Apparatus

Next, a configuration of each apparatus (the UE, and/or the access network apparatus, and/or the core network apparatus) used in each embodiment will be described with reference to the drawings. Note that each apparatus may be configured as physical hardware, may be configured as logical (virtual) hardware configured in general-purpose hardware, or may be configured as software. At least a part (including all) of the functions of each apparatus may be configured as physical hardware, logical hardware, or software.

Note that each storage unit (a storage unit #A340, a storage unit #A440, a storage unit #B540, a storage unit #A640, and a storage unit #B740) in each apparatus and function to be described later includes, for example, a semiconductor memory, a Solid State Drive (SSD), a Hard Disk Drive (HDD), or the like. Each storage unit can store not only information originally configured at the time of being shipped, but also various pieces of information transmitted and/or received to and/or from apparatuses and functions (for example, the UE, and/or the access network apparatus, and/or the core network apparatus, and/or the PDN, and/or the DN) other than the apparatus and functions of each storage unit. Each storage unit can store identification information, control information, flags, parameters, and the like included in a control message transmitted and/or received in various communication procedures to be described later. Each storage unit may store these pieces of information for each UE. In a case that each storage unit performs interworking between the 5GS and the EPS, each storage unit can store a control message and user data transmitted and/or received to and/or from the apparatuses and functions included in the 5GS and/or the EPS. In this case, not only information transmitted and/or received over the N26 interface but also information transmitted and/or received without using the N26 interface can be stored.

2.1. Apparatus Configuration of UE

Figure 3:
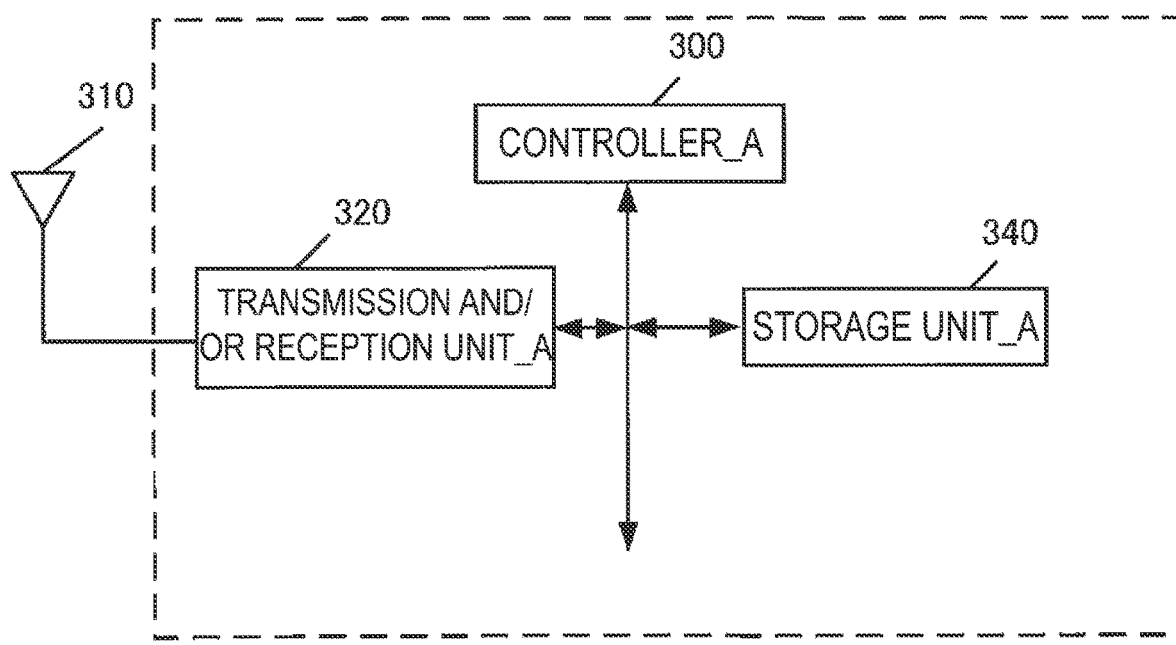
FIG. 3 is a diagram illustrating an apparatus configuration of a UE.

First, an apparatus configuration example of the User Equipment (UE) will be described with reference to FIG. 3. The UE includes a controller #A300, an antenna 310, a transmission and/or reception unit #A320, and a storage unit #A340. The controller #A300, the transmission and/or reception unit #A320, and the storage unit #A340 are connected via a bus. The transmission and/or reception unit #A320 connects to the antenna 310.

The controller #A300 is a function unit that controls the entire operations and functions of the UE. The controller #A300 reads and performs various programs stored in the storage unit #A340 as necessary, and thereby implements various types of processing in the UE.

The transmission and/or reception unit #A320 is a function unit for performing radio communication with the base station apparatus (the eNB or the gNB) in the access network via the antenna. In other words, with the use of the transmission and/or reception unit #A320, the UE can transmit and/or receive user data and/or control information to and/or from the access network apparatus, and/or the core network apparatus, and/or the PDN, and/or the DN.

Detailed description is given with reference to FIG. 2. With the use of the transmission and/or reception unit #A320, the UE can communicate with the base station apparatus (eNB) in the E-UTRAN over the LTE-Uu interface. The UE can communicate with the base station apparatus (gNB) in the 5G AN with the use of the transmission and/or reception unit #A320. The UE can transmit and/or receive a Non-Access-Stratum (NAS) message to and/or from the AMF over the N1 interface with the use of the transmission and/or reception unit #A320. Note that the N1 interface is a logical interface, and thus communication between the UE and the AMF is actually performed over the 5G AN.

The storage unit #A340 is a function unit for storing programs, user data, control information, and the like necessary for each operation of the UE.

2.2. Apparatus Configuration of gNB

Figure 4:
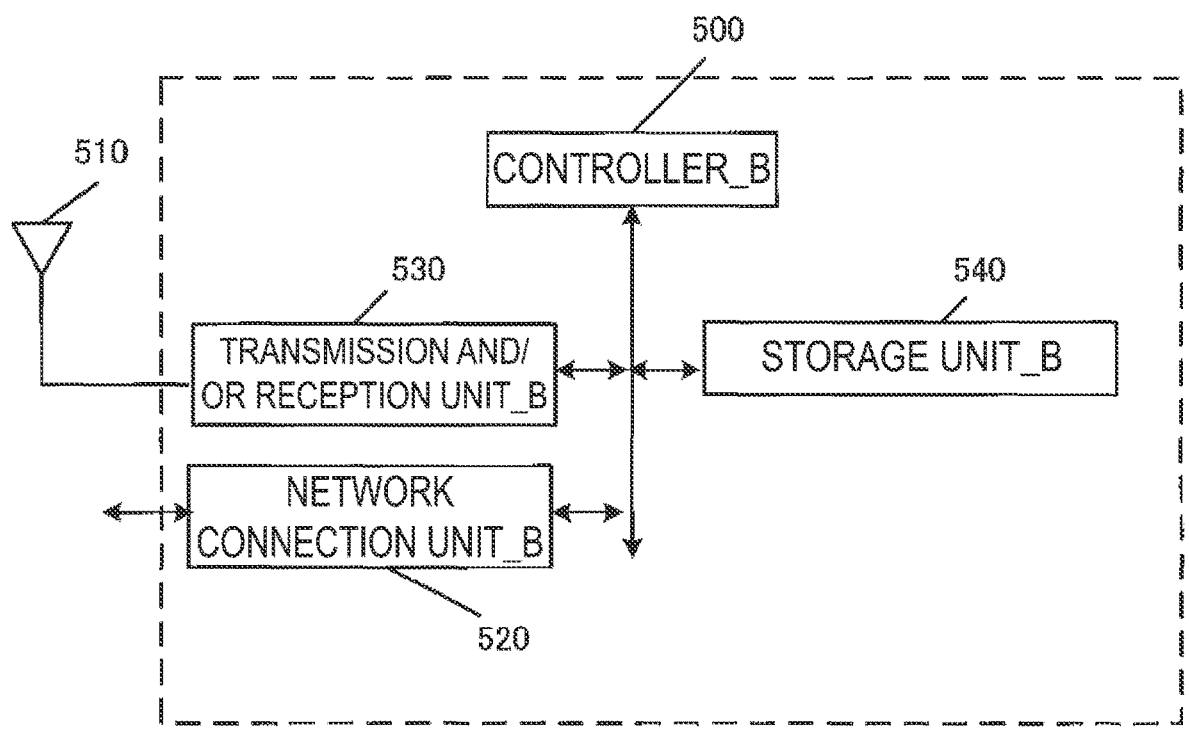
FIG. 4 is a diagram illustrating a configuration of an access network apparatus (gNB) in the 5GS.

Next, an apparatus configuration example of the gNB will be described with reference to FIG. 4. The gNB includes a controller #B500, an antenna 510, a network connection unit #B520, a transmission and/or reception unit #B530, and a storage unit #B540. The controller #B500, the network connection unit #B520, the transmission and/or reception unit #B530, and the storage unit #B540 are connected via a bus. The transmission and/or reception unit #B530 connects to the antenna 510.

The controller #B500 is a function unit that controls the entire operations and functions of the gNB. The controller #B500 reads and performs various programs stored in the storage unit #B540 as necessary, and thereby implements various types of processing in the gNB.

The network connection unit #B520 is a function unit for the gNB to communicate with the AMF and/or the UPF. In other words, with the use of the network connection unit #B520, the gNB can transmit and/or receive user data and/or control information to and/or from the AMF and/or the UPF.

The transmission and/or reception unit #B530 is a function unit for performing radio communication with the UE via the antenna 510. In other words, with the use of the transmission and/or reception unit #B530, the gNB can transmit and/or receive user data and/or control information to and/or from the UE.

Detailed description is given with reference to FIG. 2. With the use of the network connection unit #B520, the gNB in the 5G AN can communicate with the AMF over the N2 interface and can communicate with the UPF over the N3 interface. The gNB can communicate with the UE with the use of the transmission and/or reception unit #B530.

The storage unit #B540 is a function unit for storing programs, user data, control information, and the like necessary for each operation of the gNB.

2.3. Apparatus Configuration of AMF

Figure 5:
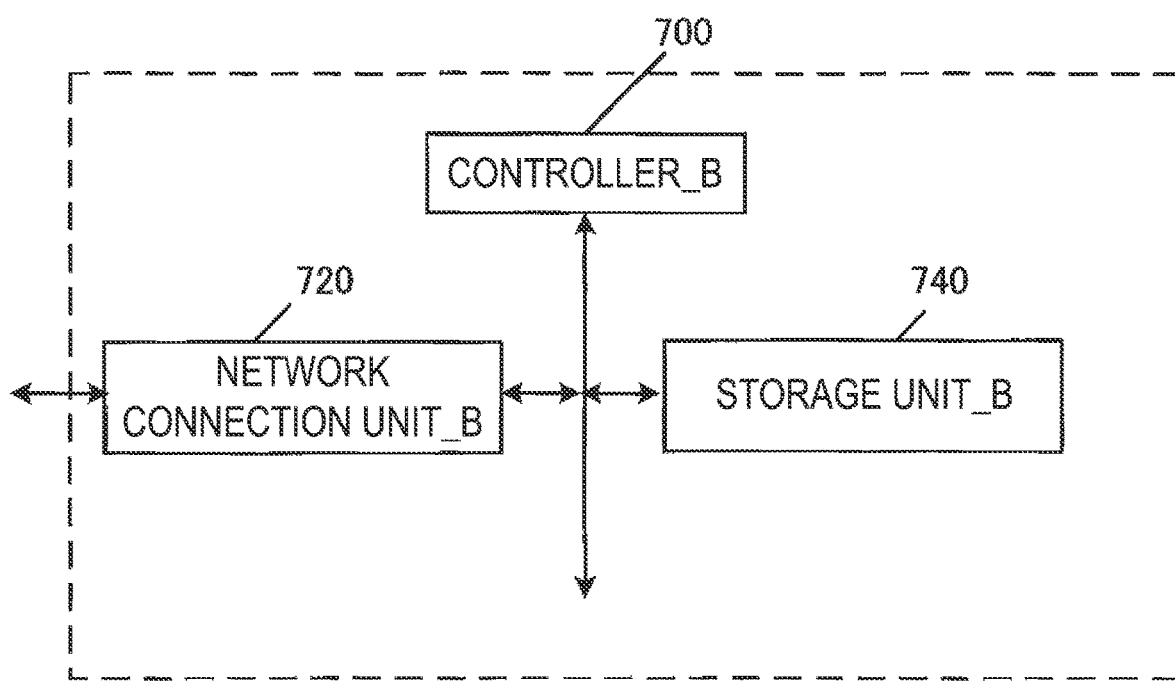
FIG. 5 is a diagram illustrating a configuration of a core network apparatus (AMF/SMF/UPF) in the 5GS.

Next, an apparatus configuration example of the AMF will be described with reference to FIG. 5. The AMF includes a controller #B700, a network connection unit #B720, and a storage unit #B740. The controller #B700, the network connection unit #B720, and the storage unit #B740 are connected via a bus. The AMF may be a node that handles the control plane.

The controller #B700 is a function unit that controls the entire operations and functions of the AMF. The controller #B700 reads and performs various programs stored in the storage unit #B740 as necessary, and thereby implements various types of processing in the AMF.

The network connection unit #B720 is a function unit for the AMF to connect to the base station apparatus (gNB), and/or the SMF, and/or the PCF, and/or the UDM, and/or the SCEF in the 5G AN. In other words, with the use of the network connection unit #B720, the AMF can transmit and/or receive user data and/or control information to and/or from the base station apparatus (gNB), and/or the SMF, and/or the PCF, and/or the UDM, and/or the SCEF in the 5G AN.

Detailed description is given with reference to FIG. 2. With the use of the network connection unit #A620, the AMF in the 5GCN can communicate with the gNB over the N2 interface, can communicate with the UDM over the N8 interface, can communicate with the SMF over the N11 interface, and can communicate with the PCF over the N15 interface. The AMF can transmit and/or receive a NAS message to and/or from the UE over the N1 interface with the use of the network connection unit #A620. Note that the N1 interface is a logical interface, and thus communication between the UE and the AMF is actually performed over the 5G AN. In a case that the AMF supports the N26 interface, the AMF can communicate with the MME over the N26 interface with the use of the network connection unit #A620.

The storage unit #B740 is a function unit for storing programs, user data, control information, and the like necessary for each operation of the AMF.

Note that the AMF has a function of exchanging a control message with the RAN using the N2 interface, a function of exchanging a NAS message with the UE using the N1 interface, a function of performing encryption and integrity protection of a NAS message, a Registration management (RM) function, a Connection management (CM) function, a Reachability management function, a Mobility management function for the UE or the like, a function of transferring a Session Management (SM) message between the UE and the SMF, an Access Authentication (Access Authorization) function, a security anchor function (Security Anchor Functionality (SEA)), a Security Context Management (SCM) function, a function of supporting the N2 interface for a Non-3GPP Interworking Function (N3IWF), a function of supporting transmission and/or reception of a NAS signal with the UE via the N3IWF, a function of authenticating the UE connected via the N3IWF, and the like.

In registration management, an RM state for each UE is managed. The RM state may be synchronized between the UE and the AMF. The RM state includes a deregistered state (RM-DEREGISTERED state) and a registered state (RM-REGISTERED state). In the RM-DEREGISTERED state, the UE is not registered in the network, and thus the AMF is in a state of being unable to reach the UE, because a UE context in the AMF does not have valid location information and routing information for the UE. In the RM-REGISTERED state, the UE is registered in the network, and thus the UE can receive a service that requires registration in the network. Note that the RM state may be referred to as a 5GMM state. In this case, the RM-DEREGISTERED state may be referred to as a 5GMM-DEREGISTERED state, and the RM-REGISTERED state may be referred to as a 5GMM-REGISTERED state.

In other words, 5GMM-REGISTERED may be a state in which each apparatus establishes a 5GMM context, or may be a state in which each apparatus establishes a PDU session context. Note that, in a case that each apparatus is 5GMM-REGISTERED, the UE #A10 may start transmission and/or reception of user data and a control message, or may respond to paging. In addition, note that, in a case that each apparatus is 5GMM-REGISTERED, the UE #A10 may perform a registration procedure other than a registration procedure for initial registration, and/or a service request procedure.

In addition, 5GMM-DEREGISTERED may be a state in which each apparatus does not establish the 5GMM context, may be a state in which the location information of the UE #A10 is not known to the network, or may be a state in which the network is in a state of being unable to reach the UE #A10. Note that, in a case that each apparatus is 5GMM-DEREGISTERED, the UE #A10 may initiate the registration procedure, or may perform the registration procedure to thereby establish the 5GMM context.

In connection management, a CM state for each UE is managed. The CM state may be synchronized between the UE and the AMF. The CM state includes a non-connected state (CM-IDLE state) and a connected state (CM-CONNECTED state). In the CM-IDLE state, the UE is in the RM-REGISTERED state, but does not have NAS signaling connection established with the AMF via the N1 interface. In the CM-IDLE state, the UE does not have connection of the N2 interface (N2 connection) and connection of the N3 interface (N3 connection). In contrast, in the CM-CONNECTED state, the UE has NAS signaling connection established with the AMF via the N1 interface. In the CM-CONNECTED state, the UE may have connection of the N2 interface (N2 connection) and/or connection of the N3 interface (N3 connection).

In addition, in connection management, management may be performed separately for the CM state in 3GPP access and the CM state in non-3GPP access. In this case, the CM state in 3GPP access may include a non-connected state in 3GPP access (CM-IDLE state over 3GPP access) and a connected state in 3GPP access (CM-CONNECTED state over 3GPP access). In addition, the CM state in non-3GPP access may include a non-connected state in non-3GPP access (CM-IDLE state over non-3GPP access) and a connected state in non-3GPP access (CM-CONNECTED state over non-3GPP access). Note that the non-connected state may be referred to as an idle mode, and a connected state mode may be referred to as a connected mode.

Note that the CM state may be referred to as a 5GMM mode. In this case, the non-connected state may be referred to as a 5GMM non-connected mode (5GMM-IDLE mode), and the connected state may be referred to as a 5GMM connected mode (5GMM-CONNECTED mode). In addition, the non-connected state in 3GPP access may be referred to as a 5GMM non-connected mode in 3GPP access (5GMM-IDLE mode over 3GPP access), and the connected state in 3GPP access may be referred to as a 5GMM connected mode in 3GPP access (5GMM-CONNECTED mode over 3GPP access). In addition, the non-connected state in non-3GPP access may be referred to as a 5GMM non-connected mode in non-3GPP access (5GMM-IDLE mode over non-3GPP access), and the connected state in non-3GPP access may be referred to as a 5GMM connected mode in non-3GPP access (5GMM-CONNECTED mode over non-3GPP access). Note that the 5GMM non-connected mode may be referred to as an idle mode, and the 5GMM connected mode may be referred to as a connected mode.

One or more AMFs may be allocated within the core network #B. The AMF may be an NF that manages one or more Network Slice Instances (NSIs). The AMF may be a common CP function (Common Control Plane Network Function (CPNF) (CCNF)) shared among multiple NSIs.

Note that, in a case that the UE connects to the 5GS over non-3GPP access, the N3IWF is an apparatus deployed and/or a function allocated between non-3GPP access and the 5GCN.

2.4. Apparatus Configuration of SMF

Next, an apparatus configuration example of the SMF will be described with reference to FIG. 5. The SMF includes a controller #B700, a network connection unit #B720, and a storage unit #B740. The controller #B700, the network connection unit #B720, and the storage unit #B740 are connected via a bus. The SMF may be a node that handles the control plane.

The controller #B700 is a function unit that controls the entire operations and functions of the SMF. The controller #B700 reads and performs various programs stored in the storage unit #B740 as necessary, and thereby implements various types of processing in the SMF.

The network connection unit #B720 is a function unit for the SMF to connect to the AMF, and/or the UPF, and/or the PCF, and/or the UDM. In other words, the SMF can transmit and/or receive user data and/or control information to and/or from the AMF, and/or the UPF, and/or the PCF, and/or the UDM by using the network connection unit #B720.

Detailed description is given with reference to FIG. 2. With the use of the network connection unit #A620, the SMF in the 5GCN can communicate with the AMF over the N11 interface, can communicate with the UPF over the N4 interface, can communicate with the PCF via the N7 interface, and can communicate with the UDM over the N10 interface.

The storage unit #B740 is a function unit for storing programs, user data, control information, and the like necessary for each operation of the SMF.

The SMF has a Session Management function such as establishment, modification, and release of a PDU session, a function of IP address allocation to the UE and management thereof, a function of selection and control of the UPF, a function of configuring the UPF for routing traffic to an appropriate destination (transmission destination), a function of transmitting and/or receiving an SM part of a NAS message, a function of issuing a notification about arrival of downlink data (Downlink Data Notification), a function of providing SM information specific to the AN (for each AN) that is transmitted to the AN through the AMF over the N2 interface, a function of determining a Session and Service Continuity mode (SSC mode) for a session, a roaming function, and the like.

2.5. Apparatus Configuration of UPF

Next, an apparatus configuration example of the UPF will be described with reference to FIG. 5. The UPF includes a controller #B700, a network connection unit #B720, and a storage unit #B740. The controller #B700, the network connection unit #B720, and the storage unit #B740 are connected via a bus. The UPF may be a node that handles the control plane.

The controller #B700 is a function unit that controls the entire operations and functions of the UPF. The controller #B700 reads and performs various programs stored in the storage unit #B740 as necessary, and thereby implements various types of processing in the UPF.

The network connection unit #B720 is a function unit for the UPF to connect to the base station apparatus (gNB), and/or the SMF, and/or the DN in the 5G AN. In other words, with the use of the network connection unit #B720, the UPF can transmit and/or receive user data and/or control information to and/or from the base station apparatus (gNB), and/or the SMF, and/or the DN in the 5G AN.

Detailed description is given with reference to FIG. 2. With the use of the network connection unit #A620, the UPF in the 5GCN can communicate with the gNB over the N3 interface, can communicate with the SMF over the N4 interface, can communicate with the DN over the N6 interface, and can communicate with another UPF over the N9 interface.

The storage unit #B740 is a function unit for storing programs, user data, control information, and the like necessary for each operation of the UPF.

The UPF has a function as an anchor point for intra-RAT mobility or inter-RAT mobility, a function as an external PDU session point to be mutually connected with the DN (that is, a function of transferring user data as a gateway between the DN and the core network #B), a function of routing and transferring packets, an Uplink Classifier (UL CL) function of supporting routing of multiple traffic flows for one DN, a Branching point function of supporting a multi-homed PDU session, a Quality of Service (QoS) processing function for the user plane, a function of verifying uplink traffic, a function of triggering buffering of downlink packets and Downlink Data Notification, and the like.

The UPF may be a gateway for IP communication and/or non-IP communication. The UPF may have a function of transferring IP communication, or may not have a function of converting non-IP communication and IP communication. Furthermore, the multiple gateways allocated may be gateways connecting the core network #B with a single DN. Note that the UPF may have connectivity with another NF, and may connect to each apparatus via another NF.

Note that the user plane refers to user data that is transmitted and/or received between the UE and the network. The user plane may be transmitted and/or received using a PDN connection or a PDU session. In addition, in a case of the EPS, the user plane may be transmitted and/or received using the LTE-Uu interface, and/or the S1-U interface, and/or the S5 interface, and/or the S8 interface, and/or the SGi interface. In addition, in a case of the 5GS, the user plane may be transmitted and/or received over the interface between the UE and the NG RAN, and/or the N3 interface, and/or the N9 interface, and/or the N6 interface. The user plane may be hereinafter referred to as a U-Plane.

In addition, the control plane refers to a control message that is transmitted and/or received in order to perform communication control of the UE or the like. The control plane may be transmitted and/or received using Non-Access-Stratum (NAS) signaling connection between the UE and the MME. In addition, in a case of the EPS, the control plane may be transmitted and/or received using the LTE-Uu interface and the S1-MME interface. In addition, in a case of the 5GS, the control plane may be transmitted and/or received using the interface between the UE and the NG RAN and the N2 interface. The control plane may be hereinafter referred to as a control plane, or may be hereinafter referred to as a C-Plane.

In addition, the User Plane (U-Plane (UP)) may be a communication path for transmitting and/or receiving user data, and may include multiple bearers. In addition, the Control Plane (C-Plane (CP)) may be a communication path for transmitting and/or receiving a control message, and may include multiple bearers.

2.6. Description of Other Apparatuses and/or Functions and Identification Information According to Present Embodiment Next, other apparatuses and/or functions and identification information will be described.

A network refers to at least some of the access network #B, the core network #B, and the DN. One or more apparatuses included in at least a portion of the access network #B, the core network #B, or the DN may be referred to as a network or a network apparatus. In other words, "a network transmits and/or receives a message and/or performs processing" may mean "an apparatus (a network apparatus and/or a control apparatus) in the network transmits and/or receives the message and/or performs the processing". Conversely, "an apparatus in a network transmits and/or receives a message and/or performs processing" may mean "the network transmits and/or receives the message and/or performs the processing".

A Network Slice Selection Function (NSSF) may be a network function (also referred to as an NF) having a function of selecting a network slice serving the UE.

A Network Data Analytics Function (NWDAF) may be an NF having a function of performing data collection from an NF and an application function (also referred to as an AF).

A Policy Control Function (PCF) may be an NF having a function of determining a policy for controlling a behavior of a network.

A Network Slice Quota (NSQ) may be an NF newly provided for supporting a function of management of a maximum number of UEs connected to a slice and/or a function of management of a maximum number of PDU sessions connected to a slice, and determining whether or not the number exceeds the maximum number of UEs and/or whether or not the number exceeds the maximum number of PDU sessions for a connectivity request to a specific slice.

A Network Repository Function (NRF) may be an NF having a service discovery function. The NRF may be an NF having a function of providing, in a case of receiving a discovery request of another NF from a certain NF, information of the discovered NF.

Note that the function of supporting the function of management of a maximum number of UEs connected to a slice and/or the function of management of a maximum number of PDU sessions connected to a slice, and determining whether or not the number exceeds the maximum number of UEs and/or whether or not the number exceeds the maximum number of PDU sessions for a connectivity request to a specific slice may be provided in the AMF, and/or the SMF, and/or the NSSF, and/or the NWDAF, and/or the PCF, and/or the NRF.

A session management (SM) message (also referred to as a Non-Access-Stratum (NAS) SM message) may be a NAS message used in a procedure for SM, or may be a control message transmitted and/or received between the UE #A10 and the SMF #A230 via the AMF #A240. In addition, the SM message may include a PDU session establishment request message, a PDU session establishment accept message, a PDU session reject (PDU session establishment reject) message, a PDU session modification request message, a PDU session modification command message, a PDU session modification complete message (PDU session modification complete), a PDU session modification command reject message, a PDU session modification reject message, a PDU session release request message, a PDU session release reject message, a PDU session release command message, a PDU session release complete message, and the like. The procedure for SM or the SM procedure may include a PDU session establishment procedure, a PDU session modification procedure, and a PDU session release procedure (UE-requested PDU session release procedure). Note that each procedure may be a procedure initiated by the UE, or may be a procedure initiated by the NW.

A Mobility management (MM) message (also referred to as a NAS MM message) may be a NAS message used for a procedure for MINI, and may be a control message transmitted and/or received between the UE #A10 and the AMF #A240. In addition, the MM message may include a Registration request message, a Registration accept message, a Registration reject message, a De-registration request message, a De-registration accept message, a configuration update command message, a configuration update accept (configuration update complete) message, a Service request message, a Service accept message, a Service reject message, a Notification message, a Notification response message, and the like. The procedure for MINI or the MM procedure may include a Registration procedure, a De-registration procedure, a Generic UE configuration update procedure, an authentication and authorization procedure, a Service request procedure, a Paging procedure, and a Notification procedure.

A 5G System (5GS) service may be a connection service provided using the core network #B190. In addition, the 5GS service may be a service different from an EPS service, or may be a service similar to the EPS service.

A non 5GS service may be a service other than the 5GS service and may include an EPS service and/or a non EPS service.

A Packet Data Network (PDN) type indicates a type of PDN connection and includes IPv4, IPv6, IPv4v6, and non-IP. In a case that IPv4 is specified, it is indicated that transmission and/or reception of data is performed using IPv4. In a case that IPv6 is specified, it is indicated that transmission and/or reception of data is performed using IPv6. In a case that IPv4v6 is specified, it is indicated that transmission and/or reception of data is performed using IPv4 or IPv6. In a case that non-IP is specified, it is indicated that communication is performed using a communication method other than the IP, not communication using the IP.

Although Protocol Data Unit/Packet Data Unit (PDU) session can be defined as a relationship between the DN that provides a PDU connectivity service and the UE, the PDU session may be connectivity established between the UE and an external gateway. By establishing a PDU session in the 5GS via the access network #B and the core network #B, the UE can transmit and/or receive user data to and/or from the DN by using the PDU session. Here, the external gateway may be a UPF, an SCEF, or the like. The UE can perform transmission and/or reception of user data to and/or from an apparatus deployed in the DN, such as an application server, by using a PDU session.

Note that each apparatus (the UE, and/or the access network apparatus, and/or the core network apparatus) may associate one or more pieces of identification information with PDU session(s) for management. Note that these pieces of identification information may include one or more of a DNN, a QoS rule, a PDU session type, application identification information, NSI identification information, access network identification information, and an SSC mode, and may further include other pieces of information. In addition, in a case that multiple PDU sessions are established, pieces of identification information associated with the PDU sessions may have the same or different contents.

The Data Network Name (DNN) may be identification information for identifying the core network and/or an external network such as the DN. In addition, the DNN can also be used as information for selecting a gateway such as the PGW #A30/UPF #A235 connecting the core network B 190. In addition, the DNN may correspond to an Access Point Name (APN).

A Protocol Data Unit/Packet Data Unit (PDU) session type indicates a type of PDU session and includes IPv4, IPv6, Ethernet, and Unstructured. In a case that IPv4 is specified, it is indicated that transmission and/or reception of data is performed using IPv4. In a case that IPv6 is specified, it is indicated that transmission and/or reception of data is performed using IPv6. In a case that Ethernet is specified, it is indicated that transmission and/or reception of an Ethernet frame is performed. Alternatively, Ethernet may indicate that communication using the IP is not performed. In a case that Unstructured is specified, it is indicated that data is transmitted and/or received to and/or from an application server in the DN or the like by using Point-to-Point (P2P) tunneling technique. For the P2P tunneling technique, for example, UDP/IP encapsulation technique may be used. Note that the PDU session type may include the IP, in addition to the above. The IP can be specified in a case that the UE can use both of IPv4 and IPv6.

A Public land mobile network (PLMN) is a communication network that provides a mobile radio communication service. The PLMN is a network managed by an operator being a communication operator, and the operator can be identified with a PLMN ID. The PLMN that matches a Mobile Country Code (MCC) and a Mobile Network Code (MNC) of an International Mobile Subscriber Identity (IMSI) of the UE may be a Home PLMN (HPLMN). Further, the UE may store an Equivalent HPLMN (EPLMN) list for identifying one or multiple Equivalent HPLMNs in a USIM. The PLMN different from the HPLMN and/or the EPLMN may be a Visited PLMN (VPLMN). The PLMN with which the UE is successfully registered may be a Registered PLMN (RPLMN).

A network slice (NS) is a logical network that provides specific network capability and network characteristics. The UE and/or the network can support the network slice (NW slice (NS)) in the 5GS. The network slice may also be simply referred to as a slice.

A network slice instance (NSI) includes a set of an instance (entity) of a network function (NF) and necessary resources and forms a network slice to be allocated. Here, the NF is a processing function in a network, and is adopted or defined in 3GPP. The NSI is an entity of one or more NSs configured in the core network #B. The NSI may include a virtual Network Function (NF) generated using a Network Slice Template (NST). Here, the NST is associated with a resource request for provision of a requested communication service and capability, and is a logical expression of one or more NFs. In other words, the NSI may be a set of multiple NFs in the core network #B190. The NSI may be a logical network configured for classifying user data to be delivered depending on a service or the like. In the NS, one or more NFs may be configured. The NF configured in the NS may or may not be an apparatus shared with another NS. The UE and/or the apparatus in the network can be allocated to one or more NSs, based on an NSSAI, and/or an S-NSSAI, and/or a UE usage type, and/or registration information such as one or more NSI IDs, and/or an APN. Note that the UE usage type is a parameter value included in registration information of the UE, which is used for identifying the NSI. The UE usage type may be stored in the HSS. The AMF may select the SMF and the UPF, based on the UE usage type.

The Single Network Slice Selection Assistance Information (S-NSSAI) is information for identifying the NS. The S-NSSAI may include only a Slice/Service type (SST), or may include both of an SST and a Slice Differentiator (SD). Here, the SST is information indicating operation of the NS expected in terms of functions and services. The SD may be information for interpolating an SST in a case of selecting one NSI out of multiple NSIs indicated by the SST. The S-NSSAI may be information unique to each PLMN or may be standard information common to the PLMNs. The network may store one or more S-NSSAIs in the registration information of the UE as default S-NSSAI(s). Note that, in a case that the S-NSSAI is a default S-NSSAI, and the UE does not transmit to a network a valid S-NSSAI in a registration request message, the network may provide an NS related to the UE.

The Network Slice Selection Assistance Information (NSSAI) is a set of S-NSSAIs. Each S-NSSAI included in the NSSAI is information for assisting the access network or the core network to select the NSI. The UE may store the NSSAI allowed by the network for each PLMN. The NSSAI may be information used for selecting the AMF.

A configured NSSAI is an NSSAI supplied and stored in the UE. The UE may store the configured NSSAI for each PLMN. The configured NSSAI may be information configured by the network (or the PLMN). The S-NSSAI included in the configured NSSAI may be referred to as a configured S-NSSAI. The configured S-NSSAI may include an S-NSSAI and a mapped S-NSSAI.

A requested NSSAI is an NSSAI provided from the UE to the network during the registration procedure. The requested NSSAI may be an allowed NSSAI or a configured NSSAI stored by the UE. Specifically, the requested NSSAI may be information indicating a network slice that the UE desires to access. The S-NSSAI included in the requested NSSAI may be referred to as a requested S-NSSAI. For example, the requested NSSAI is transmitted in the NAS message transmitted from the UE to the network such as the registration request message or the PDU session establishment request message, or a Radio Resource Control (RRC) message including the Non-Access-Stratum (NAS) message.

An allowed NSSAI is information indicating one or multiple network slices allowed for the UE. In other words, the allowed NSSAI is information for identifying the network slice that the network allows the UE to connect. As information of the UE, each of the UE and the network stores and manages the allowed NSSAI for each access (3GPP access or non-3GPP access). The S-NSSAI included in the allowed NSSAI may be referred to as an allowed S-NSSAI. The allowed S-NSSAI may include an S-NSSAI and a mapped S-NSSAI.

The mapped S-NSSAI is an S-NSSAI of the HPLMN mapping to the S-NSSAI of a registered PLMN in a roaming scenario. The UE may store one or multiple mapped S-NSSAIs mapped to the configured NSSAI and the S-NSSAI included in the Allowed NSSAI of each access type. Further, the UE may store one or multiple mapped S-NSSAIs of the S-NSSAI included in a first NSSAI and/or a rejected NSSAI.

A rejected NSSAI is information indicating one or multiple network slices not allowed for the UE. In other words, the rejected NSSAI is information for identifying the network slice that the network does not allow the UE to connect. The rejected NSSAI may be information including one or multiple combinations of the S-NSSAI and a reject cause value. Here, the reject cause value is information indicating a reason why the network rejects an associated S-NSSAI. Each of the UE and the network may appropriately store and manage the rejected NSSAI, based on the reject cause value with which each S-NSSAI is associated. Further, the rejected NSSAI may be included in the NAS message transmitted from the network to the UE such as the registration accept message, the configuration update command, and the registration reject message, or the RRC message including the NAS message. The S-NSSAI included in the rejected NSSAI may be referred to as a rejected S-NSSAI. The rejected NSSAI may be one of first to third rejected NSSAIs, a pending NSSAI, and a first NSSAI, or may be a combination of these. The S-NSSAI included in the rejected NSSAI may be referred to as a rejected S-NSSAI. The rejected S-NSSAI may include an S-NSSAI and a mapped S-NSSAI.

Here, the first rejected NSSAI is a set of one or more S-NSSAIs unavailable in the current PLMN among the S-NSSAIs that the UE includes in the requested NSSAI. The first rejected NSSAI may be a Rejected NSSAI for the current PLMN of the 5GS, a Rejected S-NSSAI for the current PLMN, or may be the S-NSSAI included in the Rejected NSSAI for the current PLMN. The first rejected NSSAI may be a rejected NSSAI stored by the UE or the NW, or may be a rejected NSSAI transmitted from the NW to the UE. In a case that the first rejected NSSAI is the rejected NSSAI transmitted from the NW to the UE, the first rejected NSSAI may be information including one or multiple combinations of the S-NSSAI and the cause value. The reject cause value in this case may be "S-NSSAI not available in the current PLMN (S-NSSAI is not available in the current PLMN)", or may be information indicating that the S-NSSAI associated with the reject cause value is not available in the current PLMN.

The first rejected NSSAI is valid in the entire registered PLMN. In other words, the UE and/or the NW may handle the first rejected NSSAI and the S-NSSAI included in the first rejected NSSAI as information independent of the access type. In other words, the first rejected NSSAI may be information valid for 3GPP access and non-3GPP access.

In a case that the UE transitions to the deregistered state in both accesses of 3GPP access and non-3GPP access for the current PLMN, the UE may delete the first rejected NSSAI from memory. In other words, in a case that the UE transitions to the deregistered state for the current PLMN via certain access, or in a case that the UE succeeds in registration with a new PLMN via certain access, or in a case that the UE fails in registration with a new PLMN via certain access and transitions to the deregistered state, and the UE is in a non-registered state (deregistered state) via other access, the UE deletes the first rejected NSSAI.

The second rejected NSSAI is a set of one or multiple S-NSSAIs unavailable in the current registration area among the S-NSSAIs that the UE includes in the requested NSSAI. The second rejected NSSAI may be a Rejected NSSAI for the current registration area of the 5GS. The second rejected NSSAI may be a rejected NSSAI stored by the UE or the NW, or may be a rejected NSSAI transmitted from the NW to the UE. In a case that the second rejected NSSAI is the rejected NSSAI transmitted from the NW to the UE, the second rejected NSSAI may be information including one or multiple combinations of the S-NSSAI and the cause value. The cause value in this case may be "S-NSSAI not available in the current registration area (S-NSSAI is not available in the current registration area)", and may be information indicating that the S-NSSAI associated with the cause value is not available in the current registration area.

The second rejected NSSAI is valid in the current registration area. In other words, the UE and/or the NW may handle the second rejected NSSAI and the S-NSSAI included in the second rejected NSSAI as information for each access type. In other words, the second rejected NSSAI may be information valid for each of 3GPP access and non-3GPP access. In other words, in a case that the UE transitions to the deregistered state for certain access for the moment, the UE may delete the second rejected NSSAI from memory.

The third rejected NSSAI is a set of one or multiple S-NSSAIs that require NSSAA and for which NSSAA fails or is revoked. The third rejected NSSAI may be an NSSAI stored by the UE and/or the NW, or may be transmitted from the NW to the UE. In a case that the third rejected NSSAI is transmitted from the NW to the UE, the third rejected NSSAI may be information including one or multiple combinations of the S-NSSAI and the reject cause value. The reject cause value in this case may be "S-NSSAI not available due to failure or revocation of NSSAA (S-NSSAI is not available due to the failed or revoked network slice-specific authorization and authentication)", and may be information indicating that NSSAA for the S-NSSAI associated with the reject cause value has failed or has been revoked.

The third rejected NSSAI is valid in the entire registered PLMN. In other words, the UE and/or the NW may handle the third rejected NSSAI and the S-NSSAI included in the third rejected NSSAI as information independent of the access type. In other words, the third rejected NSSAI may be information valid for 3GPP access and non-3GPP access. The third rejected NSSAI may be an NSSAI different from the rejected NSSAI. The third rejected NSSAI may be the first rejected NSSAI.

The third rejected NSSAI is a rejected NSSAI allowing the UE to identify the slice that is rejected due to failure or revocation of NSSAA from the core network. Specifically, while the UE stores the third rejected NSSAI, the UE does not initiate the registration request procedure for the S-NSSAI included in the third rejected NSSAI. The third rejected NSSAI may be identification information including one or multiple S-NSSAIs received from the core network in association with the reject cause value indicating failure of NSSAA. The third rejected NSSAI is information independent of the access type. Specifically, in a case that the UE stores the third rejected NSSAI, the UE need not attempt transmission of the registration request message including the S-NSSAI included in the third rejected NSSAI to both of 3GPP access and non-3GPP access. Alternatively, the UE can transmit the registration request message including the S-NSSAI included in the third rejected NSSAI, based on a UE policy. Alternatively, the UE may delete the third rejected NSSAI based on the UE policy, and transition to a state in which the UE can transmit the registration request message including the S-NSSAI included in the third rejected NSSAI. In other words, in a case that the UE transmits the registration request message including the S-NSSAI included in the third rejected NSSAI based on the UE policy, the UE may delete the S-NSSAI from the third rejected NSSAI.

The first NSSAI is information including one or multiple S-NSSAIs that the maximum number of UEs for each network slice or the maximum number of PDU sessions for each network slice has been reached. The first NSSAI may be the rejected NSSAI, may be the Allowed NSSAI, or may be the Pending NSSAI. The first NSSAI may be an NSSAI stored by the UE and/or the NW, or may be an NSSAI transmitted from the NW to the UE.

In a case that the first NSSAI is transmitted from the NW to the UE, the first NSSAI may be information including one or more pieces of information that includes at least one of the S-NSSAI and the mapped S-NSSAI, the cause value, a value of a back-off timer, and information indicating an effective range of the value of the back-off timer. The cause value in this case may be "S-NSSAI that has reached the maximum number of UEs or the maximum number of PDU sessions for each network slice", and may be information indicating that the number has reached the maximum number of UEs or the maximum number of PDU sessions that can be allowed for the S-NSSAI associated with the reject cause value. Here, the cause value may be a reject cause value included in the Rejected NSSAI, or may be flag information. Further, in this case, the value of the back-off timer may be information indicating a period in which the UE is prohibited from transmitting the MM message and transmitting the SM message using a corresponding S-NSSAI or the S-NSSAI related to the mapped S-NSSAI.

Further, the information indicating the effective range of the value of the back-off timer may be information indicating whether the value of the back-off timer is adapted to the current Public Land Mobile Network (PLMN), is adapted to all of the PLMNs, or is valid in the current registration area.

The first NSSAI may be valid in the entire registered PLMN, may be valid in all of the PLMNs, or may be valid in the registration area. In a case that the first NSSAI is valid in the entire registered PLMN or all of the PLMNs, the UE and/or the NW may handle the first NSSAI and the S-NSSAI included in the first NSSAI as information independent of the access type. In a case that the first NSSAI is valid in the registration area, the UE and/or the NW may handle the first NSSAI and the S-NSSAI included in the first NSSAI as information for each access type.

The first NSSAI may be the allowed NSSAI, may be the rejected NSSAI, may be the pending NSSAI, or may be information different from these.

The pending NSSAI is a set of one or multiple S-NSSAIs that require network slice specific authentication by the network, for which the network slice specific authentication has not completed yet, and that are not available in the current PLMN. The pending NSSAI may be a Rejected NSSAI due to NSSAA or a pending NSSAI of the 5GS. The pending NSSAI may be a NSSAI stored by the UE or the NW, and may be an NSSAI transmitted from the NW to the UE. Note that the pending NSSAI is not limited to the rejected NSSAI, and may be an NSSAI independent of the rejected NSSAI. In a case that the pending NSSAI is an NSSAI transmitted from the NW to the UE, the pending NSSAI may be information including one or multiple combinations of the S-NSSAI and the reject cause value. The reject cause value in this case may be "S-NSSAI pending for NSSAA (NSSAA is pending for the S-NSSAI)", or may be information indicating that the UE is prohibited from or awaiting (pending) using the S-NSSAI associated with the reject cause value until NSSAA for the S-NSSAI completes.

The pending NSSAI is valid in the entire registered PLMN. In other words, the UE and/or the NW may handle the third rejected NSSAI and the S-NSSAI included in the pending NSSAI as information independent of the access type. In other words, the pending NSSAI may be information valid for 3GPP access and non-3GPP access. The pending NSSAI may be an NSSAI different from the rejected NSSAI. The pending NSSAI may be the first rejected NSSAI.

The pending NSSAI is the NSSAI including one or multiple S-NSSAIs allowing the UE to identify the slice in which the procedure is pending. Specifically, while the UE stores the pending NSSAI, the UE does not initiate the registration request procedure for the S-NSSAI included in the pending NSSAI. In other words, the UE does not use the S-NSSAI included in the pending NSSAI during the registration procedure until NSSAA for the S-NSSAI included in the pending NSSAI completes. The pending NSSAI is identification information including one or multiple S-NSSAIs received from the core network in association with the reject cause value indicating pending for NSSAA. The pending NSSAI is information independent of the access type. Specifically, in a case that the UE stores the pending NSSAI, the UE does not attempt transmission of the registration request message including the S-NSSAI included in the pending NSSAI to both of 3GPP access and non-3GPP access.

A tracking area is a single or multiple ranges that can be expressed using the location information of the UE #A10 managed by the core network. The tracking area may include multiple cells. In addition, the tracking area may be an area in which a control message such as paging is broadcast, or may be an area in which the UE #A10 can move without performing a handover procedure. In addition, the tracking area may be a routing area, may be a location area, or may be an area similar to these. The tracking area may be hereinafter a Tracking Area (TA). The tracking area may be identified with a Tracking Area Identity (TAI including a Tracking area code (TAC) and a PLMN.

The registration area (Registration area or registration area) is a set of one or multiple TAs that the AMF allocates to the UE. Note that, while the UE #A10 moves in one or multiple TAs included in the registration area, the UE #A10 may be able to move without transmitting and/or receiving a signal for tracking area update. In other words, the registration area may be an information group indicating an area in which the UE #A10 can move without performing a tracking area update procedure. The registration area may be identified with a TAI list including one or multiple TAIs.

A UE ID is information for identifying the UE. Specifically, the UE ID may be a SUbscription Concealed Identifier (SUCI), or a Subscription Permanent Identifier (SUPI), or a Globally Unique Temporary Identifier (GUTI), or an International Mobile Subscriber Identity (IMEI), or an IMEI Software Version (IMEISV), or a Temporary Mobile Subscriber Identity (TMSI), for example. Alternatively, the UE ID may be other information configured by an application or within the network. Moreover, the UE ID may be information for identifying the user.

A Network Slice-Specific Authentication and Authorization (NSSAA) function is a function for implementing network slice specific authentication and authorization. With network slice specific authentication and authorization, authentication and authorization of the UE can be performed outside the core network such as a 3rd Party. The PLMN and the network apparatus having the NSSAA function can perform an NSSAA procedure for a certain S-NSSAI, based on registration information of the UE. Further, the UE having the NSSAA function can manage and store the rejected NSSAI for pending for NSSAA and/or the rejected NSSAI for failure of NSSAA. NSSAA may be herein referred to as a network slice specific authentication and authorization procedure or an authentication and authorization procedure.

The S-NSSAI that requires NSSAA is an S-NSSAI that requires NSSAA managed by the core network and/or the core network apparatus. The core network and/or the core network apparatus may store the S-NSSAI that requires NSSAA by associating the S-NSSAI and information indicating whether or not NSSAA is required. In addition, the core network and/or the core network apparatus may store by associating the S-NSSAI that requires NSSAA and information indicating whether or not NSSAA has completed or information indicating NSSAA has completed and the state is an allowed or success state. The core network and/or the core network apparatus may manage the S-NSSAI that requires NSSAA as information unrelated to the access network.

Management of the maximum number of UEs connected to a slice is management of the maximum number of UEs that can be registered with the network slice or the S-NSSAI at the same time. Here, the UE registered with the network slice or the S-NSSAI may be the S-NSSAI indicating the network slice being stored in the Allowed NSSAI. Apparatuses in a network supporting the function of management of the maximum number of UEs connected to a slice can confirm whether or not management of the maximum number of UEs connected to a slice is required can be stored and whether or not the number of registered UEs reaches a fixed value being the maximum number during the registration procedure for each S-NSSAI. Further, each apparatus supporting the function of management of the maximum number of UEs connected to a slice may be able to store the first NSSAI. The maximum number of UEs connected to a slice may be herein referred to as a maximum number of UEs connected for each slice, or a maximum number of UEs that can be registered with the network slice or the S-NSSAI, or a maximum number of UEs, or a fixed value (also referred to as a quota).

Management of the maximum number of PDU sessions connected to a slice is management of the maximum number of PDU sessions that can be established in the network slice or the S-NSSAI at the same time. Here, the PDU session that can be established in the network slice or the S-NSSAI may be the S-NSSAI indicating the network slice being stored in the Allowed NSSAI. Apparatuses in a network supporting the function of management of the maximum number of PDU sessions connected to a slice can confirm whether or not management of the maximum number of PDU sessions connected to a slice is required can be stored and whether or not the number of established PDU sessions reaches a fixed value being the maximum number during the PDU session establishment procedure for each S-NSSAI. Further, each apparatus supporting the function of management of the maximum number of PDU sessions connected to a slice may be able to store the first NSSAI. The maximum number of PDU sessions connected to a slice may be herein referred to as a maximum number of PDU sessions connected for each slice, or a maximum number of PDU sessions established in the network slice or the S-NSSAI, or a maximum number of PDU sessions, or a fixed value (also referred to as a quota).

The back-off timer may be a timer for prohibiting initiation of the procedure due to transmission of the MINI message and/or the SM message by the UE. The back-off timer is managed and performed by the UE. The back-off timer may be associated with the S-NSSAI. While the back-off timer associated with the S-NSSAI is effective, the UE may be in a state in which transmission of the MM message and/or transmission of the SM message using the S-NSSAI is prohibited, regulated, or limited. These regulations may be regulations by congestion control of the 5GS, or may be regulations including the regulations by congestion control of the 5GS.

The back-off timer may be a timer started and/or stopped for each S-NSSAI and/or PLMN.

Specifically, the back-off timer may be associated with the S-NSSAI, or may be a timer for prohibiting transmission of the MM message and/or the SM message using a specific S-NSSAI. In other words, the UE may be configured not to transmit the MINI message and/or the SM message using a specific S-NSSAI during counting of the timer.

Further, the UE may be configured so that transmission of the MM message and/or the SM message that has been prohibited in a PLMN before being changed is allowed in a new PLMN based on a specific condition to be described later during counting of the timer. Note that the expression that transmission of the MM message and/or the SM message that has been prohibited in a PLMN before being changed is allowed may mean that transmission of the MINI message and/or the SM message using the same S-NSSAI as the S-NSSAI associated with the back-off timer, and/or the S-NSSAI related to the same S-NSSAI, and/or the S-NSSAI related to the mapped S-NSSAI of the same S-NSSAI is allowed.

Further, the back-off timer may be a timer for prohibiting transmission of the MM message using a specific NSSAI. In other words, the UE may be configured not to transmit the MM message using the specific NSSAI and/or the NSSAI including the specific S-NSSAI during counting of the timer.

Further, the UE may be configured so that transmission of the MINI message that has been prohibited in a PLMN before being changed is allowed in a new PLMN based on a specific condition to be described later during counting of the timer. Note that the expression that transmission of the MINI message that has been prohibited in a PLMN before being changed is allowed may mean that transmission of the MM message using the same NSSAI as the NSSAI associated with the back-off timer and/or the NSSAI including the same S-NSSAI as the S-NSSAI associated with the back-off timer is allowed. Further, the expression that transmission of the MM message that has been prohibited in a PLMN before being changed is allowed may mean that transmission of the MINI message using the NSSAI including the S-NSSAI related to the S-NSSAI associated with the back-off timer and/or the NSSAI including the S-NSSAI related to the mapped S-NSSAI of the S-NSSAI associated with the back-off timer is allowed.

The back-off timer may be associated with no NSSAI, and may be a timer for prohibiting transmission of the MINI message using no NSSAI. In other words, the UE #A10 may be configured not to transmit the MINI message using no NSSAI during counting of the timer. Further, the UE #A10 may be configured so that transmission of the MM message that has been prohibited in a PLMN before being changed is allowed in a new PLMN based on a specific condition to be described later during counting of the timer. Note that the expression that transmission of the MINI message that has been prohibited in a PLMN before being changed is allowed may mean that the MINI message using no NSSAI is allowed.

Further, the back-off timer may be a timer of 5GMM and/or a timer of EPS mobility management (EMM). Further, the back-off timer may be a timer T3448, or may be a timer equivalent to the timer T3448. In other words, the back-off timer may be the same timer as the timer for regulating communication of user data via the control plane, or may be a timer similar thereto.

Next, in the present embodiment, the identification information transmitted and/or received and stored and managed by each apparatus will be described.

First, the 1st identification information is information indicating the network slice with which the UE desires to register. The 1st identification information may be information including one or more S-NSSAIs associated with the network slice with which the UE desires to register. The S-NSSAI included in the 1st identification information may be the S-NSSAI included in the configured NSSAI associated with the current PLMN, or may be the S-NSSAI included in the allowed NSSAI associated with the current PLMN. In other words, the 1st identification information may be the S-NSSAI included in the configured NSSAI associated with one or more current PLMNs, or the S-NSSAI included in the allowed NSSAI associated with one or more current PLMNs, or a combination of the above two. Further, specifically, the allowed NSSAI associated with the current PLMN may be the allowed NSSAI associated with the current PLMN and the current access type. Further, the 1st identification information may be a Requested NSSAI of the 5GS.

Note that the S-NSSAI included in the 1st identification information may be the S-NSSAI not included in the rejected NSSAI, and/or the pending NSSAI, and/or the first NSSAI. Further, the S-NSSAI included in the 1st identification information may be the S-NSSAI in which the back-off timer associated with the S-NSSAI or the mapped S-NSSAI of the S-NSSAI is not performed.

The 2nd identification information may be information indicating that the UE supports the function for management of the maximum number of UEs connected to a slice. The 2nd identification information may be information indicating whether or not the UE supports the function for management of the maximum number of UEs connected to a slice. The 2nd identification information may be 5GMM capability information. The 2nd identification information may be information indicating that the UE can store.

The 3rd identification information may be information indicating that the UE supports the function for management of the maximum number of PDU sessions connected to a slice. The 3rd identification information may be information indicating whether or not the UE supports the function for management of the maximum number of UEs connected to a slice. The 3rd identification information may be 5GSM capability information. The 3rd identification information may be information indicating that the UE can store.

The 4th identification information may be a PDU session ID for identifying the PDU session requested to be established.

The 5th identification information may be a Data Network Name (DNN). The 5th identification information may be information indicating the DNN requested by the UE. The 5th identification information may be a DNN for identifying a DN being a connection destination of the PDU session requested to be established.

The 10th identification information may be information indicating the S-NSSAI that has reached the maximum number of UEs or the maximum number of PDU sessions that can be registered with the network slice or the S-NSSAI. The 10th identification information may be included in the Allowed NSSAI transmitted from the network, may be included in the Rejected NSSAI transmitted from the network, may be included in the Pending NSSAI transmitted from the network, or may be transmitted from the network as information different from these.

Further, the 10th identification information may be the NSSAI. Further, the 10th identification information may be the Allowed NSSAI, or the Rejected NSSAI, or the Pending NSSAI, or the NSSAI different from these.

The 10th identification information may be the S-NSSAI included in the first NSSAI or the first NSSAI. The 10th identification information may include at least one of the 11th identification information to the 18th identification information. Specifically, the 10th identification information may include at least one or more pieces of information out of the S-NSSAI that has reached the maximum number of UEs or the maximum number of PDU sessions that can be registered with the network slice or the S-NSSAI, the mapped S-NSSAI of the S-NSSAI, a cause value indicating that the number has reached the maximum number of UEs or the maximum number of PDU sessions that can be registered with the network slice or the S-NSSAI, a value of the back-off timer indicating a period in which the UE is prohibited from performing transmission the MM message or the SM message using the S-NSSAI, and information indicating the effective range of the back-off timer.

Further, the 10th identification information may include at least one or more pieces of information out of a cause value indicating that the number has reached the maximum number of UEs or the maximum number of PDU sessions that can be registered with the network slice, a value of the back-off timer indicating a period in which transmission of the MM message or the
SM message using no NSSAI is prohibited, and information indicating the effective range of the back-off timer. Note that the cause value indicating that the number has reached the maximum number of UEs or the maximum number of PDU sessions that can be registered with the network slice, the value of the back-off timer indicating a period in which transmission of the MM message or the SM message using no NSSAI is prohibited, and the information indicating the effective range of the back-off timer may be separately transmitted and/or received without being included in the 10th identification information.

Here, in a case that the 10th identification information is included in the rejected NSSAI, the cause value included in the 10th identification information may be the reject cause value.

The 11th identification information may be information and/or a cause value used by the network to indicate for the UE that the number has reached the maximum number of UEs or the maximum number of PDU sessions that can be registered with the network slice or the S-NSSAI. The 11th identification information may be information and/or a cause value indicating that the use of the S-NSSAI is rejected or restricted because the maximum number of UEs or the maximum number of PDU sessions connected for each slice has been reached. In other words, the 11th identification information is information and a cause value used by the UE to indicate for the network that the use of the S-NSSAI is rejected or restricted because the number has reached the maximum number of UEs or the maximum number of PDU sessions connected for each slice. The 11th identification information may be included in the 10th identification information, or may be associated with the S-NSSAI indicated by the 14th identification information included in the same 10th identification information, and/or the mapped S-NSSAI indicated by the 15th identification information. The 11th identification information may be associated with each piece of identification information included in the same 10th identification information. In a case that the 11th identification information is included in the rejected NSSAI, the 11th identification information may be the reject cause value. The 11th identification information may be flag information.

Further, the 11th identification information may be a cause value indicating that connection to the slice is restricted and/or is not allowed. Further, the 11th identification information may be a cause value indicating that registration with the slice is restricted and/or is not allowed.

Further, the 11th identification information may be 5G Mobility Management (5GMM) cause. For example, the 11th identification information may be the 22nd 5GMM cause. Here, the 22nd 5GMM cause may be a cause value indicating Congestion. Further, the 22nd 5GMM cause may be information transmitted to the UE due to congestion of the network. The 11th identification information may be the 62nd 5GMM cause. Here, the 62nd 5GMM cause may be a cause value indicating that there is no available network slice. The 11th identification information may be the 69th 5GMM cause. Here, the 69th 5GMM cause may be a cause value indicating that resources for a specific network slice are insufficient.

Further, the 11th identification information may be a 5GMM cause other than the 22nd 5GMM cause. For example, the 11th identification information may be information transmitted to the UE due to congestion of the network slice. Further, the 11th identification information may be information transmitted to the UE due to deficiency of resources of the network slice. Further, the 11th identification information may be a cause value indicating that a requested service cannot be provided due to deficiency of resources for a specific slice.

The 11th identification information may be 5G Session Management (5GSM) cause. For example, the 11th identification information may be the 22nd 5GSM cause. Here, the 22nd 5GSM cause may be a cause value indicating Congestion. Further, the 22nd 5GSM cause may be information transmitted to the UE due to congestion of the network. The 11th identification information may be the 62nd 5GSM cause. Here, the 62nd 5GSM cause may be a cause value indicating that there is no available network slice. The 11th identification information may be the 69th 5GSM cause. Here, the 69th 5GSM cause may be a cause value indicating that resources for a specific network slice are insufficient.

The 12th identification information may be a value of the back-off timer. Specifically, the 12th identification information may be information indicating a period in which the network prohibits the UE from transmitting the MM message using the S-NSSAI indicated by the 14th identification information and/or the 15th identification information included in the same 10th identification information, or transmitting the SM message other than a PDU connection release request message. In other words, the 12th identification information may be information indicating a period in which the network prohibits the UE from transmitting the registration request message or the PDU session establishment request message using the S-NSSAI indicated by the 14th identification information and/or the 15th identification information included in the same 10th identification information.

The 12th identification information may be included in the 10th identification information, or may be associated with the S-NSSAI indicated by the 14th identification information included in the same 10th identification information, and/or the mapped S-NSSAI indicated by the 15th identification information. The 12th identification information may be associated with each piece of identification information included in the same 10th identification information.

The 13th identification information is information indicating the effective range of the back-off timer. Specifically, the 13th identification information may be information indicating the effective range of the back-off timer counted by the UE using a value of a corresponding back-off timer. Further, specifically, the 13th identification information may be information indicating that the corresponding back-off timer is adapted to the current PLMN or adapted to all of the PLMNs. In addition or alternatively, the 13th identification information may be information indicating adaptation to the current registration area.

Further, the 13th identification information may be information indicating a range of regulation, or may be information indicating a range to which regulation is adapted. Note that the regulation may be a regulation by congestion control. More specifically, the regulation may be to restrict transmission of the MINI message or the SM message by the UE. Further, the regulation may be implemented by the back-off timer.

The 13th identification information may be included in the 10th identification information, and in that case, the value of the corresponding back-off timer may be a value indicated by the 12th identification information included in the same 10th identification information. Further, in that case, the 13th identification information may be associated with each piece of identification information included in the same 10th identification information.

The 14th identification information is information indicating the S-NSSAI that the maximum number of UEs that can be registered for each S-NSSAI has been reached or the S-NSSAI that the maximum number of PDU sessions for each S-NSSAI has been reached. The 14th identification information may be the S-NSSAI included in the 10th identification information, or may be associated with the mapped S-NSSAI indicated by the 15th identification information included in the same 10th identification information. The 14th identification information may be associated with each piece of identification information included in the same 10th identification information. Further, the 14th identification information may be the S-NSSAI.

The 15th identification information is the S-NSSAI of the HPLMN associated with a corresponding S-NSSAI. Specifically, in a case that the current PLMN is not the HPLMN, the 15th identification information may be information indicating the S-NSSAI of the HPLMN mapped to the S-NSSAI of the current PLMN.

The 15th identification information may be the mapped S-NSSAI included in the 10th identification information, may be associated with the S-NSSAI indicated by the 14th identification information included in the same 10th identification information, or may be the mapped S-NSSAI of the S-NSSAI indicated by the 14th identification information in such a case. The 15th identification information may be associated with each piece of identification information included in the same 10th identification information. Further, the 15th identification information may be the mapped S-NSSAI of the S-NSSAI indicated by the 14th identification information.

The 16th identification information may be the PDU session ID for identifying the PDU session to be established.

The 17th identification information may be the first QoS information. For example, the 17th identification information may be a session Aggregate Maximum Bit Rate (AMBR) Information Element (IE). The 17th identification information may indicate a maximum bit rate applied to the established PDU session. The 17th identification information may indicate an unrestricted bit rate, which is the maximum bit rate applied to the established PDU session. In other words, the 17th identification information may indicate the maximum bit rate to be applied to the PDU session in a case that regulation due to congestion is canceled.

The 18th identification information may be the second QoS information. Here, the second QoS information may be information indicating QoS having quality lower than that of the first QoS information. For example, the 18th identification information may be the second session AMBR IE. The 18th identification information may indicate a restricted bit rate, which is the maximum bit rate applied to the established PDU session. In other words, the 17th identification information may indicate the maximum bit rate to be applied to the PDU session in a case that regulation due to congestion is performed.

3. First Embodiment

3.1. Procedures Used in First Embodiment

First, procedures used in a first embodiment will be described. The procedures used in the first embodiment include a Registration procedure, a Generic UE configuration update procedure, a Paging procedure, a Notification procedure, a Network-initiated de-registration procedure, a PDU session establishment procedure, and a PDU session modification procedure. Each procedure will be described below.

Note that, in the first embodiment, a case that each of the combinations including the HSS and the UDM, the PCF and the PCRF, the SMF and the PGW-C, and the UPF and the PGW-U is configured to form a single apparatus (that is, the same physical hardware, or the same logical hardware, or the same software) as illustrated in FIG. 2 will be described as an example. However, the details described in the present embodiment can also be applied to a case that each of the combinations is configured to form different apparatuses (that is, different pieces of physical hardware, or different pieces of logical hardware, or different pieces of software). For example, data may be directly transmitted and/or received between these apparatuses, data may be transmitted and/or received over the N26 interface between the AMF and the MME, or data may be transmitted and/or received via the UE.

3.2. Registration Procedure

First, the Registration procedure will be described with reference to FIG. 6. Hereinafter, the present procedure will refer to the registration procedure. The registration procedure is a procedure for registration with the access network #B, and/or the core network #B, and/or the DN as initiated by the UE. In a case that the UE is in a state of not being registered with the network, for example, the UE can perform the present procedure at any timing such as the timing at which the UE is turned on. In other words, the UE can initiate the present procedure at any timing in a case that the UE is in the deregistered state (5GMM-DEREGISTERED state). Each apparatus (in particular, the UE and the AMF) can transition to the registered state (5GMM-REGISTERED state), based on completion of the registration procedure. Note that each registered state may be managed in each apparatus for each access. Specifically, each apparatus may independently manage states of registration for 3GPP access (the registered state or the deregistered state) and states of registration for non-3GPP access.

In addition, the registration procedure may be a procedure for updating position registration information of the UE in the network, and/or periodically giving a notification of the state of the UE from the UE to the network, and/or updating a specific parameter related to the UE in the network.

In a case that the UE performs mobility for crossing a TA, the UE may initiate the registration procedure. In other words, in a case that the UE moves to a TA that is different from the TA indicated in the stored TA list, the UE may initiate the registration procedure. In addition, the UE may initiate the present procedure in a case that a running back-off timer or another timer expires. In addition, the UE may initiate the registration procedure in a case that a context of each apparatus needs to be updated due to disconnection and deactivation of a PDU session. In addition, in a case that there is a change in capability information and/or a preference, related to PDU session establishment, of the UE, the UE may initiate the registration procedure. In addition, the UE may periodically initiate the registration procedure. Moreover, the UE may initiate the registration procedure based on completion of the generic UE configuration update procedure, or completion of the registration procedure, or completion of the PDU session establishment procedure, or completion of the PDU session management procedure, or information received from the network in each procedure, or expiration or stop of the back-off timer. Note that these are not restrictive, and the UE can perform the registration procedure at any timing.

Note that the above-described procedure for the UE to transition from the state (deregistered state) of not being registered with the network to the state (registered state) of being registered therewith may be an initial registration procedure or a registration procedure for initial registration. The registration procedure performed in the state (registered state) in which the UE is registered with the network may be a registration procedure for mobility and periodic registration update or a mobility and periodic registration procedure.

Figure 6:
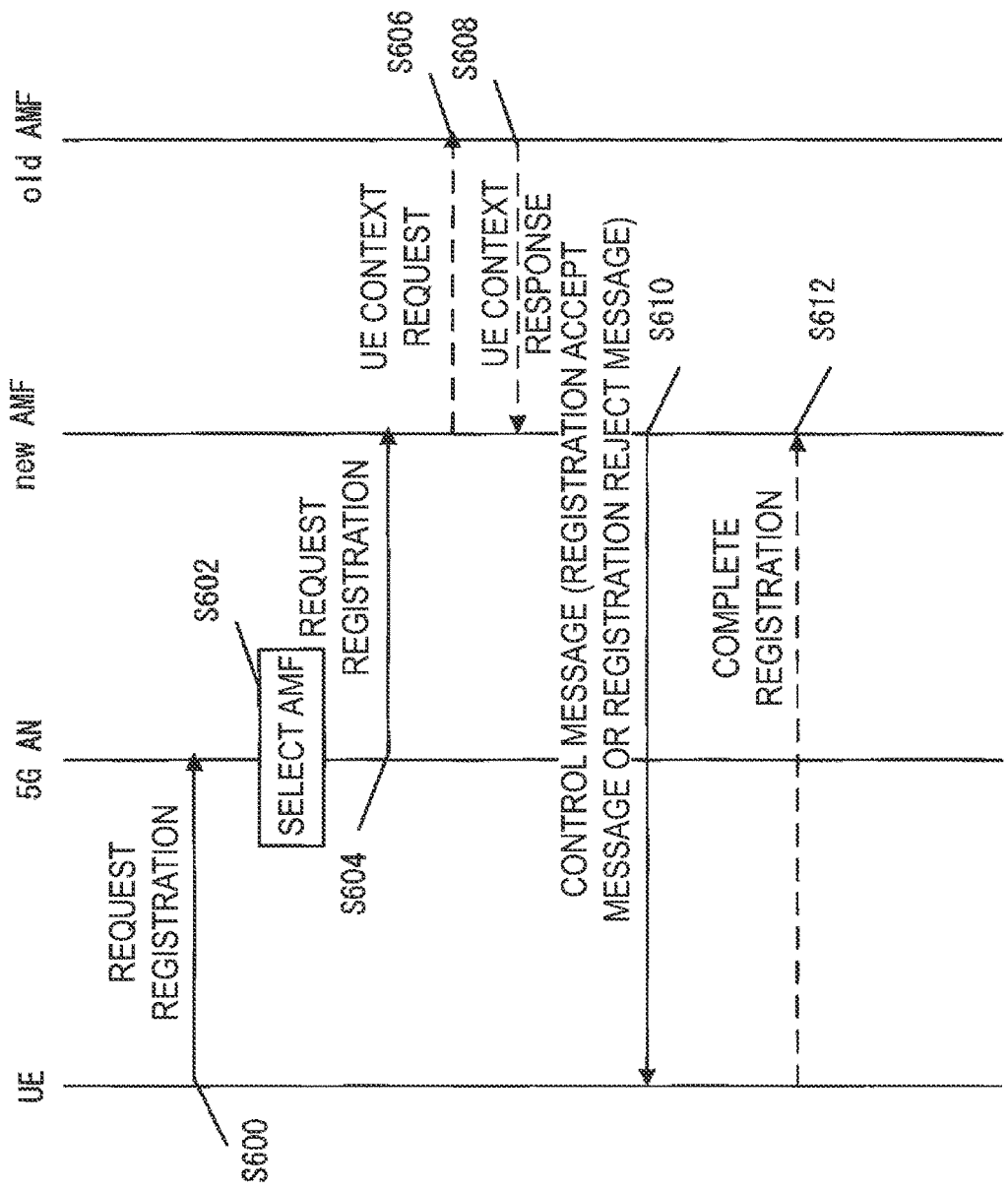
FIG. 6 is a diagram illustrating a registration procedure.

The new AMF of FIG. 6 indicates an AMF with which the UE is registered in the present procedure, and the old AMF means an AMF with which the UE is previously registered in a procedure prior to the present procedure. In a case that a change of the AMF does not occur in the present procedure, an interface between the old AMF and the new AMF and a procedure between the old AMF and the new AMF do not occur, and the new AMF and the old AMF may be the same apparatus. In the present embodiment, the description "AMF" may mean the new AMF, may mean the old AMF, or may mean both of those.

First, the UE initiates the registration procedure by transmitting a Registration request message to the new AMF (S600), (S602), and (S604). Specifically, the UE transmits an RRC message including the registration request message to the 5G AN (or the gNB) (S600). Moreover, the registration request message is an NAS message transmitted and/or received over the N1 interface. The RRC message may be a control message transmitted and/or received between the UE and the 5G AN (or the gNB). The NAS message is processed in the NAS layer, and the RRC message is processed in the RRC layer. Note that the NAS layer is a layer higher than the RRC layer.

Here, the UE can include one or more pieces of identification information out of the 1st identification information to the 3rd identification information and the 5th identification information in the registration request message and/or the RRC message for transmission. Here, the 1st identification information to the 3rd identification information may be as described in section 2.6. Further, the UE may include identification information indicating a type of the present procedure in the registration request message and/or the RRC message for transmission. Here, the identification information indicating a type of the present procedure may be a 5GS registration type IE, or may be information indicating that the present procedure is a registration procedure for initial registration, or for registration information update due to mobility, or for periodic registration information update, or for registration in the event of an emergency.

The UE may include capability information of the UE in the registration request message in order to notify the network of a function supported by the UE. Here, the capability information of the UE may be 5GMM capability of the 5GS.

The UE may include these pieces of identification information in a control message different from these for transmission, such as a control message of a layer (for example, a Medium Access Control (MAC) layer, a Radio Link Control (RLC) layer, a Packet Data Convergence Protocol (PDCP) layer) that is lower than the RRC layer (Radio Resource Control). Note that, by transmitting these pieces of identification information, the UE may indicate that the UE supports each function, may indicate a request of the UE, or may indicate both of these. Further, in a case that multiple pieces of identification information are transmitted and/or received, two or more pieces of identification information of these pieces of identification information may be configured as one or more pieces of identification information. Note that information indicating support of each function and information indicating the request of use of each function may be transmitted and/or received as the same piece of identification information, or may be transmitted and/or received as different pieces of identification information.

Note that the UE may select and determine whether or not to transmit the 1st identification information to the 3rd identification information and the 5th identification information to the network, based on the capability information of the UE, and/or the UE policy, and/or the state of the UE, and/or the registration information of the user, and/or the context stored by the UE, and/or the like.

In a case that the UE includes the function for management of the maximum number of UEs connected to a slice, or requests at least one S-NSSAI that requires management for management of the maximum number of UEs connected to a slice, the UE may transmit the 2nd identification information. By transmitting the 2nd identification information, the UE may notify the network of inclusion of the function of storing the first NSSAI.

In a case that the UE includes the function for management of the maximum number of PDU sessions connected to a slice, or requests at least one S-NSSAI that requires management for management of the maximum number of PDU sessions connected to a slice, the UE may transmit the 3rd identification information. By transmitting the 3rd identification information, the UE may notify the network of inclusion of the function of storing the first NSSAI.

Further, in a case that the UE includes the NSSAA function, or requests at least one S-NSSAI for identifying a slice that requires NSSAA, the UE may include in the registration request message as the capability information for transmission. By transmitting the capability information, the UE may request the network to handle the UE as the UE including the NSSAA function, and to perform the authentication and authorization procedure by the NSSAA function in a procedure related to the UE.

The UE may store the allowed NSSAI for requested access of a requested PLMN, and/or the configured NSSAI and the rejected NSSAI for a requested PLMN. Further, the UE may also store the mapped S-NSSAI of the S-NSSAI included in each NSSAI.

In a case that the UE stores the allowed NSSAI and/or stores the configured NSSAI for requested access of a requested PLMN, the UE may transmit the 2nd identification information. The UE may select one or multiple S-NSSAIs out of the stored allowed NSSAI and/or configured NSSAI, and include the one or multiple S-NSSAIs in the 1st identification information for transmission. Further, in a case that the UE stores the rejected NSSAI, the UE may not include the S-NSSAI included in the rejected NSSAI in the 1st identification information, and may transmit the S-NSSAI. Further, in a case that the back-off timer associated with a certain S-NSSAI is activated, in other words, in a case that the back-off timer is running, or until the back-off timer is stopped, the UE may not include the S-NSSAI or an S-NSSAI related to the S-NSSAI in the 1st identification information, and may transmit the S-NSSAI. Specifically, in a case that the S-NSSAI associated with the back-off timer is the S-NSSAI of the requested PLMN, and in a case that the back-off timer is activated, the UE may not include the S-NSSAI in the 1st identification information, and may transmit the S-NSSAI.

The UE may also include information other than the 1st identification information to the 3rd identification information and the 5th identification information in the registration request message and/or the RRC message including the registration request message, and may include, for example, the UE ID and/or the PLMN ID and/or AMF identification information for transmission. Here, the AMF identification information may be information for identifying an AMF or a set of AMFs, and may be, for example, a 5G S-Temporary Mobile Subscription Identifier (5G-S-TMSI) or a Globally Unique AMF Identifier (GUAMI).

By including and transmitting an SM message (for example, the PDU session establishment request message) in the registration request message, or by transmitting an SM message (for example, the PDU session establishment request message) together with the registration request message, the UE may initiate the PDU session establishment procedure during the registration procedure.

In a case that the 5G AN (or the gNB) receives the RRC message including the registration request message, then the 5G AN (or the gNB) selects the AMF to transfer the registration request message (S602). Note that the 5G AN (or the gNB) can select the AMF based on the registration request message and/or one or more pieces of identification information included in the RRC message including the registration request message. Specifically, the 5G AN (or the gNB) may select the new AMF being a transmission destination of the registration request message, based on at least one piece of identification information out of the 1st identification information to the 3rd identification information and the 5th identification information.

For example, the 5G AN (or the gNB) may select the AMF, based on the 1st identification information. Specifically, the 5G AN (or the gNB) may select the AMF that is included in the network slice identified with the S-NSSAI included in the 1st identification information, or that has connectivity to the network slice.

Further, for example, the 5G AN (or the gNB) may select the AMF that includes the function for management of the maximum number of UEs connected to a slice and/or the AMF that has connectivity to the network including the function for management of the maximum number of UEs connected to a slice, based on the 2nd identification information.

Note that the method of selecting the AMF is not limited thereto and the 5G AN (or the gNB) may select the AMF based on other conditions. The 5G AN (or the gNB) extracts the registration request message from the received RRC message and transfers the registration request message to the selected new AMF (S604). Note that, in a case that at least one piece of identification information out of the 1st identification information to the 2nd identification information is not included in the registration request message but is included in the RRC message, the identification information included in the RRC message may be transferred to the selected AMF together with the registration request message (S604).

In a case that the new AMF receives the registration request message, the AMF can perform the first condition fulfillment determination. The first condition fulfillment determination is a condition fulfillment determination for determining whether or not the network (or the new AMF) accepts the request from the UE. In a case that the first condition fulfillment determination is true, the new AMF performs the procedure of S606 to S612. In contrast, in a case that the first condition fulfillment determination is false, the new AMF may perform the procedure of S610 without performing the procedure of S606 to S608.

Note that the first condition fulfillment determination may be performed by a network function (also referred to as an NF) other than the new AMF. The NF may be, for example, a Network Slice Selection Function (NSSF), a Network Data Analytics Function (NWDAF), a Policy Control Function (PCF), or a Network Slice Quota (NSQ). In a case that the NF other than the new AMF performs the first condition fulfillment determination, the new AMF may provide the NF with at least a part of information necessary for performing the first condition fulfillment determination, specifically, information received from the UE. Then, in a case that the NF determines true or false of the first condition fulfillment determination based on the information received from the AMF, the NF may notify the AMF of information including results (in other words, true or false) of the first condition fulfillment determination. The New AMF may determine the identification information and/or the control message to be transmitted to the UE, based on the results of the first condition fulfillment determination received from the NF.

Alternatively, the new AMF may perform the first condition fulfillment determination after requesting the UE context from the old AMF and receiving the UE context from the old AMF (S606 and S608). In such a case, in a case that the first condition fulfillment determination is true, the new AMF performs S610 and S612. In contrast, in a case that the first condition fulfillment determination is false, the new AMF may perform S610.

Note that, here, in a case that the first condition fulfillment determination is true, the control message transmitted and/or received in S610 may be the Registration accept message, and in a case that the first condition fulfillment determination is false, the control message transmitted and/or received in S610 may be the Registration reject message.

Note that the first condition fulfillment determination may be performed based on reception of the registration request message, and/or each piece of identification information included in the registration request message, and/or subscriber information, and/or capability information of the network, and/or an operator policy, and/or a network state, and/or registration information of a user, and/or a context stored in the AMF, and/or the like.

For example, the first condition fulfillment determination may be true in a case that the network allows the request from the UE, and the first condition fulfillment determination may be false in a case that the network does not allow the request from the UE. In a case that a network with which the UE is to be registered and/or an apparatus in the network supports the function requested by the UE, the first condition fulfillment determination may be true, whereas in a case that the network and/or the apparatus does not support the function requested by the UE, the first condition fulfillment determination may be false. In addition, in a case that the transmitted and/or received identification information is allowed, the first condition fulfillment determination may be true, whereas in a case that the transmitted and/or received identification information is not allowed, the first condition fulfillment determination may be false.

In a case that the S-NSSAI included in the requested NSSAI received by the AMF from the UE is information for identifying a slice that requires the NSSAA procedure, and further, in a case that the AMF stores success for results of the NSSAA procedure of a corresponding S-NSSAI for the UE, the first condition fulfillment determination may be true. Alternatively, in a case that there is no S-NSSAI allowed for the UE, and there is no plan of allocating the Allowed NSSAI to the UE in future either, the first condition fulfillment determination may be false.

In a case that the S-NSSAI included in the requested NSSAI received by the AMF from the UE is information for identifying a slice that requires management of the maximum number of UEs connected to a slice, and further, in a case that the number of UEs connected to the slice does not reach the maximum number of UEs, the first condition fulfillment determination may be true. Note that, in a case that the S-NSSAI included in the requested NSSAI received by the AMF from the UE is information for identifying a slice that requires management of the maximum number of UEs connected to a slice, the first condition fulfillment determination may be invariably true. Alternatively, in a case that there is no S-NSSAI allowed for the UE as well, in a case that allocation of the Allowed NSSAI to the UE can also be expected in future, the first condition fulfillment determination may be true.

In a case that the AMF allocates the first NSSAI to the UE in a case that there is no S-NSSAI allowed for the UE, the first condition fulfillment determination may be true or may be false.

In a case that the new AMF is different from the AMF indicated by the AMF identification information included in a message received from the UE, the new AMF performs the procedure of S606 and S608, and in a case that the new AMF is the same as the AMF indicated by the AMF identification information included in a message received from the UE, the new AMF does not perform the procedure of S606 and S608.

In other words, in a case that a change of the AMF occurs in the present procedure, the procedure of S606 and S608 is performed, and in a case that a change of the AMF does not occur, the procedure of S606 and S608 is skipped.

The transfer procedure of the UE context (S606 and S608) will be described. The new AMF transmits a request message of the UE context to the old AMF, with the AMF indicated by the AMF identification information being the old AMF (S606). The old AMF transmits the UE context to the new AMF, based on the received request message of the UE context. The New AMF generates the UE context, based on the received UE context.

Here, the UE context transmitted from the new AMF to the old AMF may include the UE ID and the allowed NSSAI. In addition, the UE context may include the configured NSSAI and/or the rejected NSSAI, the NSSAI and/or the pending NSSAI, and/or the first NSSAI. The allowed NSSAI, and/or the configured NSSAI, and/or the rejected NSSAI, and/or the pending NSSAI, and/or the first NSSAI included in the UE context, and the S-NSSAI included in each NSSAI may be associated with information as to whether or not notification to the UE has completed.

The UE context may include information of the S-NSSAI that requires the NSSAA procedure, and/or information indicating authentication that the NSSAA procedure has completed for the UE has succeeded, and/or information indicating that the authentication has failed.

The UE context may include information of the S-NSSAI that requires management of the maximum number of UEs connected to a slice, and/or information indicating that the number has reached the maximum number of UEs, and/or information indicating whether or not the number has reached the maximum number of UEs connected to a slice.

Note that these pieces of information related to the characteristics of the S-NSSAI may be managed as one piece of information. Specifically, for each S-NSSAI, the network may store by associating with information indicating whether or not NSSAA is required, whether or not NSSAA has succeeded, whether or not management of the maximum number of UEs connected to a slice is required, and whether or not the number has reached the maximum number of UEs connected to a slice.

The new AMF transmits a control message to the UE, based on determination of the first condition fulfillment determination, and/or based on reception of the UE context from the old AMF (S610). The control message may be the registration accept message, or may be the registration reject message.

The new AMF may include one or multiple pieces of 10th identification information in the control message for transmission. Alternatively, the new AMF may include at least one or more pieces of identification information out of the 10th identification information to the 15th identification information in the control message for transmission. Here, the 10th identification information to the 15th identification information may be as described in section 2.6. Note that, by transmitting these pieces of identification information and/or the control message, the AMF may indicate that the network supports each function, may indicate that the request of the UE has been accepted, may indicate that the request from the UE is not allowed, or may indicate information of a combination of these. Further, in a case that multiple pieces of identification information are transmitted and/or received, two or more pieces of identification information of these pieces of identification information may be configured as one or more pieces of identification information. Note that information indicating support of each function and information indicating the request of use of each function may be transmitted and/or received as the same piece of identification information, or may be transmitted and/or received as different pieces of identification information.

In a case that the AMF receives at least one of the 1st identification information to the 3rd identification information and the 5th identification information from the UE, and/or there is update of configuration information of the UE since the last registration procedure, the AMF may transmit at least one of the 10th identification information to the 15th identification information.

In a case that the AMF receives at least one of the 1st identification information to the 3rd identification information from the UE, the AMF may include at least one piece of identification information out of the 10th identification information to the 15th identification information in the control message for transmission.

The AMF may further include the configured NSSAI, and/or the allowed NSSAI, and/or the rejected NSSAI, and/or the pending NSSAI in the control message for transmission. Note that the 10th identification information to the 15th identification information may be transmitted in the allowed NSSAI, and/or the rejected NSSAI, and/or the pending NSSAI, or may be transmitted as information different from these.

In a case that the AMF is scheduled to perform the NSSAA procedure after completion of the present procedure or in parallel with the present procedure although there is no S-NSSAI (allowed NSSAI) allowed for the UE at the time of transmission of the control message, or the AMF is in the middle of performing the NSSAA procedure between the UE and the network, or the AMF includes the pending NSSAI in the control message for transmission, the AMF may include an empty value in the allowed NSSAI for transmission.

In a case that the AMF includes the 10th identification information in the control message although there is no S-NSSAI (allowed NSSAI) allowed for the UE at the time of transmission of the control message, or in a case that the AMF has already notified the UE of the first NSSAI prior to the present procedure, the AMF may include an empty value in the Allowed NSSAI for transmission.

In a case that the AMF includes the 13th identification information indicating adaptation to all of the PLMNs in the control message, the AMF may also include the 15th identification information in the control message.

In a case that the S-NSSAI included in the requested NSSAI received from the UE is information for identifying a slice that requires management of the maximum number of UEs connected to a slice, and in a case that the number of UEs connected to the slice has reached the maximum number of UEs, the AMF may include the 10th identification information to the 15th identification information in the control message.

The UE receives the control message and/or one or more pieces of information out of the 10th identification information to the 15th identification information from the network. More specifically, the UE receives the control message and/or one or more pieces of information out of the 10th identification information to the 15th identification information from the new AMF.

The UE may recognize the received information, based on reception of at least one piece of information out of the 10th identification information to the 15th identification information. Specifically, the UE may recognize that the UE is in a state in which the UE is temporarily prohibited from performing transmission of the MM message and/or transmission of the SM message using the S-NSSAI indicated by the 10th identification information, and/or the S-NSSAI indicated by the 14th identification information, and/or the S-NSSAI related to the mapped S-NSSAI indicated by the 15th identification information, for the reason that the number has reached the maximum number of UEs connected for each slice. Note that, here, the MM procedure may be the registration request message, and the SM message may be the PDU session establishment request message.

The UE may perform the following operation for each piece of 10th identification information, based on reception of at least one or more pieces of information out of the 10th identification information to the 15th identification information, and/or reception of the control message.

The UE may store the S-NSSAI indicated by the 10th identification information, and/or the S-NSSAI indicated by the 14th identification information, and/or the S-NSSAI related to the mapped S-NSSAI indicated by the 15th identification information in an appropriate first NSSAI. Specifically, the UE may add the received S-NSSAI indicated by the 14th identification information to the first NSSAI that is associated with information indicated by the 11th identification information and/or the 13th identification information.

Alternatively, the UE may add the received mapped S-NSSAI indicated by the 15th identification information to the first NSSAI, may add the S-NSSAI related to the received mapped S-NSSAI indicated by the 15th identification information to the first NSSAI associated with the current PLMN, may add to the first NSSAI associated with the current PLMN and the current access type, or may add to the first NSSAI(s) associated with the current PLMN and all of the access types.

Further, in a case that the S-NSSAI included in the first NSSAI stored by the UE is included in the allowed NSSAI associated with the PLMN and the access type requested by the UE in the present procedure and other access types being stored by the UE, the S-NSSAI may be deleted from the allowed NSSAI.

Further, in a case that the UE receives the 15th identification information, the UE may store the S-NSSAI indicated by the 15th identification information as the mapped S-NSSAI of the S-NSSAI indicated by the 14th identification information.

In a case that the received 13th identification information is information indicating adaptation to all of the PLMNs, the UE may delete the S-NSSAI related to the mapped S-NSSAI indicated by the 15th identification information from the allowed NSSAI corresponding to the PLMN other than the current PLMN.

The UE may recognize that the S-NSSAI indicated by the 10th identification information has reached the maximum number of UEs connected for each slice, based on reception of the 10th identification information and/or the 11th identification information, and/or reception of the control message. Here, the S-NSSAI indicated by the 10th identification information may be the S-NSSAI indicated by the 14th identification information and/or the mapped S-NSSAI indicated by the 15th identification information.

The UE may start count of the back-off timer associated with the S-NSSAI or the back-off timer, or may manage the back-off timer, with the received value of the back-off timer, based on reception of at least one or more pieces of information out of the 10th identification information to the 15th identification information and/or reception of the control message. Here, the value of the back-off timer may be a value of the timer indicated by the 10th identification information and/or the 12th identification information, and the S-NSSAI may be the S-NSSAI indicated by the 1st identification information, and/or the 10th identification information, and/or the 14th identification information, and/or the mapped S-NSSAI indicated by the 15th identification information.

While the back-off timer is running, the UE may be in a state in which the UE is prohibited from performing transmission of the MM message and/or the SM message using the S-NSSAI associated with the back-off timer, or the mapped S-NSSAI associated with the back-off timer, or the S-NSSAI related to the mapped S-NSSAI associated with the back-off timer.

Further, in a case that the UE receives the 13th identification information, the UE may adapt the back-off timer according to the effective range indicated by the 13th identification information.

Specifically, in a case that the 13th identification information is information indicating adaptation in the current PLMN, the UE may adapt the back-off timer in the current PLMN. Specifically, due to a change of the PLMN (PLMN change), although the UE need not stop count of the back-off timer or the back-off timer, regulation by the back-off timer associated with the PLMN before movement may be canceled. In other words, in a case that the PLMN is changed, although the UE maintains the back-off timer, regulation for the PLMN before movement may be canceled.

Alternatively, due to a change of the PLMN, the UE may stop count of the back-off timer associated with the current PLMN or the back-off timer. In other words, in a case that the PLMN is changed, the UE may stop the back-off timer, and regulation for the PLMN before movement may be canceled.

Alternatively, in a case that the 13th identification information is information indicating adaptation to all of the PLMNs, the UE may adapt the back-off timer in all of the PLMNs. In other words, even in a case that a change of the PLMN occurs, the UE may maintain the back-off timer instead of stopping the back-off timer. In a case that a change of the PLMN occurs while the back-off timer is running, the UE may maintain the state in which the UE is prohibited from performing transmission of the MINI message and/or the SM message using the S-NSSAI of a movement destination PLMN associated with the mapped S-NSSAI of the S-NSSAI that has been associated with the back-off timer, or the S-NSSAI of the movement destination PLMN related to the mapped S-NSSAI, or the mapped S-NSSAI.

Alternatively, in a case that the 13th identification information is information indicating adaptation in the current registration area, the UE may adapt the back-off timer in the current registration area. In other words, due to the UE exiting from the registration area, the UE may stop count of the back-off timer or the back-off timer.

Further, the UE may manage and/or store the first NSSAI associated with the 11th identification information and/or the 13th identification information.

Here, due to stop or expiration of the back-off timer, restriction may be canceled, and the UE may transition to a state in which the UE can transmit the MINI message and/or the SM message using the S-NSSAI that has been associated with the back-off timer, and/or the S-NSSAI related to the mapped S-NSSAI that has been associated with the back-off timer, and/or the mapped S-NSSAI that has been associated with the back-off timer. In other words, due to stop or expiration of the back-off timer, the UE may transition to a state in which the UE can perform transmission of the MM message and/or the SM message using the S-NSSAI that has been associated with the back-off timer, and/or the S-NSSAI related to the mapped S-NSSAI that has been associated with the back-off timer, and/or the mapped S-NSSAI that has been associated with the back-off timer as the Requested NSSAI.

Further, due to stop or expiration of the back-off timer, the UE may transition to a state in which the UE can perform transmission of the MM message and/or the SM message using the NSSAI that has been associated with the back-off timer. In other words, due to stop or expiration of the back-off timer, the UE may transition to a state in which the UE can perform transmission of the MM message and/or the SM message using the NSSAI that has been associated with the back-off timer as the Requested NSSAI.

Further, due to stop or expiration of the back-off timer, the UE may remove, from the first NSSAI, the S-NSSAI that has been associated with the back-off timer, or the mapped S-NSSAI that has been associated with the back-off timer, or the S-NSSAI related to the mapped S-NSSAI that has been associated with the back-off timer.

Note that each type of processing performed by the UE based on reception of each piece of identification information described above may be performed during the present procedure or after completion of the present procedure or may be performed based on completion of the present procedure after completion of the present procedure.

Note that the AMF may select and determine which piece of identification information out of the 10th identification information to the 15th identification information is to be included in the control message, based on each piece of received identification information, and/or subscriber information, and/or capability information of the network, and/or an operator policy, and/or the state of the network, and/or the registration information of the user, and/or the context stored by the AMF, and/or the like.

In a case that the control message is the registration accept message, the AMF can either include and transmit an SM message (for example, the PDU session establishment accept message) in the registration accept message, or transmit an SM message (for example, the PDU session establishment accept message) together with the registration accept message. However, such a transmission method may be performed in a case that the SM message (for example, the PDU session establishment request message) is included in the registration request message. Also, such a transmission method may be performed in a case that the SM message (for example, the PDU session establishment request message) is transmitted along with the registration request message. By performing such a transmission method as described above, the AMF can indicate that a procedure for SM is accepted in the registration procedure.

Based on each piece of the received identification information, and/or the subscriber information, and/or the capability information of the network, and/or the operator policy, and/or the state of the network, and/or the registration information of the user, and/or the context stored by the AMF, and/or the like, by transmitting the registration accept message, the AMF may indicate that the request of the UE has been accepted, and by transmitting the registration reject message, the AMF may indicate that the request of the UE has been rejected.

The UE receives the control message via the 5G AN (gNB) (S608). In a case that the control message is the registration accept message, by receiving the registration accept message, the UE can recognize that the request from the UE on the registration request message is accepted, and recognize details of various pieces of identification information included in the registration accept message. In a case that the control message is the registration reject message, the UE can recognize that the request from the UE using the registration request message has been rejected and the content of various kinds of identification information included in the registration reject message by receiving the registration reject message. In a case that the UE does not receive the control message even after a prescribed time period has elapsed after transmitting the registration request message, the UE may recognize that the request from the UE is rejected.

Further, in a case that the control message is the registration accept message, the UE can further transmit to the AMF a registration complete message as a response message to the registration accept message via the 5G AN (gNB) (S610). Note that, in a case that the UE receives the SM message such as the PDU session establishment accept message, the UE may include and transmit the SM message such as the PDU session establishment complete message in the registration complete message, or may indicate that the procedure for SM has completed by including the SM message. Here, the registration complete message is a NAS message transmitted and/or received over the N1 interface; however, between the UE and the 5G AN (gNB), the registration complete message is transmitted and/or received on an RRC message.

The AMF receives the registration complete message via the 5G AN (gNB) (S612). Each apparatus completes the present procedure, based on transmission and/or reception of the registration accept message and/or the registration complete message.

Each apparatus may complete the registration procedure based on the transmission and/or reception of the registration reject message.

Note that, each apparatus may transition to or maintain the state (RM #REGISTERED state or 5GMM-REGISTERED state) in which the UE is registered with the network based on transmission and/or reception of the registration accept message and/or the registration complete message, or each apparatus may transition to or maintain the state (RM #DEREGISTERED state or 5GMM-DEREGISTERED state) in which the UE is not registered with the network on access in which the UE receives the registration reject message for the current PLMN based on transmission and/or reception of the registration reject message. Also, the transition of each apparatus to each state may be performed based on transmission and/or reception of the registration complete message or completion of the registration procedure.

In addition, each apparatus may perform processing based on information transmitted and/or received in the registration procedure based on completion of the registration procedure. For example, in a case that information indicating that a part of the request from the UE is rejected is transmitted and/or received, a reason of rejection of the request from the UE may be recognized. In addition, each apparatus may perform the present procedure again or may perform the registration procedure on the core network #A or another cell based on the cause for the rejection of the request from the UE.

Moreover, the UE may store the identification information received along with the registration accept message and/or the registration reject message or may recognize determination of the network, based on the completion of the registration procedure.

Further, each apparatus may initiate the registration procedure again, based on expiration or stop of the back-off timer.

Note that the registration procedure described in the present section may be the registration procedure for initial registration, or may be the registration procedure for mobility and periodic registration.

3.2.1. Update Procedure

In the registration procedure of section 3.2, each apparatus including the UE transmitting and/or receiving the registration accept message including at least a part of the 10th identification information to the 15th identification information may cause a state in which the UE is registered with the network, or a state in which the UE is registered with a network slice different from a specific network slice with which the UE requested to be registered. Further, the UE and the core network apparatus (for example, the AMF) may be in a state of having the back-off timer started. The back-off timer may be associated with a specific network slice (S-NSSAI). Further, the UE and the core network apparatus (for example, the AMF) may be in a state of not being capable of transmitting the MM message (for example, the registration request message) and/or the SM message (for example, the PDU session establishment request message) for the same network slice while having the back-off timer for the network slice run.

The following will describe an update procedure for extending or reducing or stopping the back-off timer before expiration of the back-off timer, with the UE and the core network apparatus (for example, the AMF) having the back-off timer run.

The update procedure may include a Generic UE configuration update procedure, a Paging procedure, a Notification procedure, and a Network-initiated de-registration procedure. Note that the update procedure using the generic UE configuration update procedure will be described in section 3.2.2. The update procedure using the paging procedure will be described in section 3.2.3. The update procedure using the notification procedure will be described in section 3.2.4. Moreover, the update procedure using the network-initiated de-registration procedure will be described in section 3.2.5.

3.2.2. Update Procedure Using Generic UE Configuration Update Procedure

Figure 8:
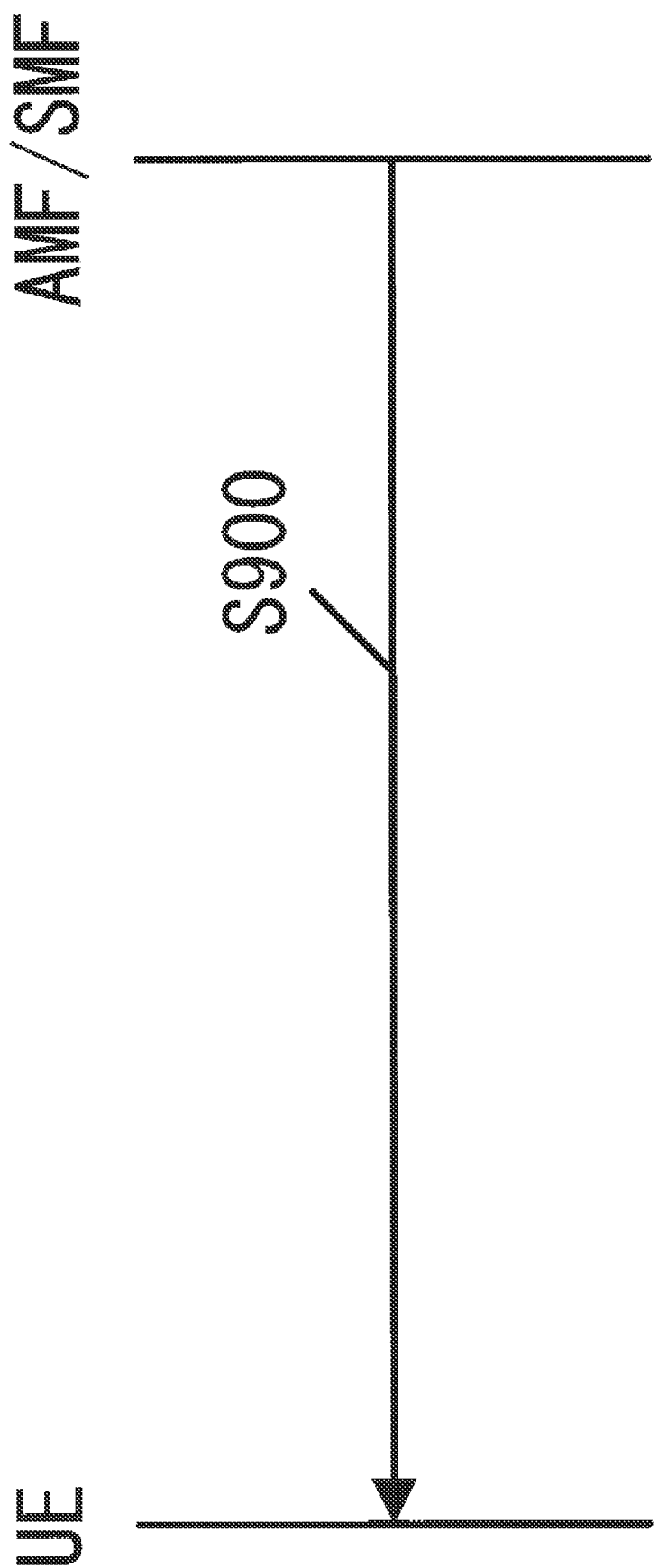
FIG. 8 is a diagram illustrating an update procedure.

The present procedure is initiated by the AMF transmitting a Configuration update command to the UE via the access network (S900 of FIG. 8). Note that the configuration update command may include at least a part of the 10th identification information to the 15th identification information.

Further, the configuration update command may include information indicating whether or not the registration procedure and/or the PDU session establishment procedure is requested to be performed. Further, the configuration update command may include information indicating whether or not a response to the configuration update command is requested.

Each apparatus including the UE can change the back-off timer value by transmitting and/or receiving the configuration update command including at least a part of the 10th identification information to the 15th identification information.

After stopping the back-off timer, each apparatus including the UE may be in a state of being capable of transmitting the MM message and/or the SM message for a specific network slice.

In a case that each apparatus including the UE extends or reduces the back-off timer, each apparatus including the UE may be in a state of not being capable of transmitting the MM message and/or the SM message for a specific network slice.

Further, the behavior of each apparatus including the UE in a case that the back-off timer expires may be the behavior similar to that in a case that the back-off timer stops.

Here, the 11th identification information included in the configuration update command may be the same as or may be different from the 11th identification information transmitted and/or received in the registration accept message in the registration procedure of section 3.2.

For example, the 11th identification information included in the configuration update command may indicate that congestion for the S-NSSAI has been solved, may indicate that the UE can transmit the MM message and/or the SM message for the S-NSSAI, or may indicate that the UE can transmit the MM message and/or the SM message for the S-NSSAI because congestion for the S-NSSAI is solved.

For example, the 11th identification information included in the configuration update command may indicate that congestion for the S-NSSAI has not been solved, may indicate that the UE cannot transmit the MM message and/or the SM message for the S-NSSAI, or may indicate that the UE cannot transmit the MM message and/or the SM message for the S-NSSAI because congestion for the S-NSSAI is not solved.

The 11th identification information included in the configuration update command may indicate that congestion for a default S-NSSAI has been solved, may indicate that the UE can transmit the MM message and/or the SM message for no NSSAI, or may indicate that the UE can transmit the MM message and/or the SM message for no NSSAI because congestion for the default S-NSSAI is solved. Further, the 11th identification information included in the configuration update command may indicate that congestion for no NSSAI has been solved, or may indicate that the UE can transmit the MM message and/or the SM message for no NSSAI because congestion for no NSSAI is solved.

The 11th identification information included in the configuration update command may indicate that congestion for the default S-NSSAI has not been solved, may indicate that the UE cannot transmit the MM message and/or the SM message for no NSSAI, or may indicate that the UE cannot transmit the MM message and/or the SM message for no NSSAI because congestion for the default S-NSSAI is not solved. The 11th identification information included in the configuration update command may indicate that congestion for no NSSAI has not been solved, or may indicate that the UE cannot transmit the MM message and/or the SM message for no NSSAI because congestion for no NSSAI is not solved.

The 12th identification information included in the configuration update command may be the same as or may be different from the back-off timer value indicated by the 12th identification information transmitted and/or received in the registration accept message in the registration procedure of section 3.2.

For example, by configuring the back-off timer value indicated by the 12th identification information included in the configuration update command to 0, the running back-off timer may be stopped.

For example, by not including the 12th identification information in the configuration update command, the running back-off timer may be stopped.

For example, by configuring the back-off timer value indicated by the 12th identification information included in the configuration update command to a value other than 0, the running back-off timer may be extended or reduced.

Note that the 11th identification information and the 12th identification information included in the configuration update command may be associated with each other.

For example, in a case that the running back-off timer is to be stopped, the 11th identification information included in the configuration update command may indicate that congestion for the S-NSSAI has been solved, may indicate that the UE can transmit the MM message and/or the SM message for the S-NSSAI, or may indicate that the UE can transmit the MM message and/or the SM message for the S-NSSAI because congestion for the S-NSSAI is solved.

For example, in a case that the running back-off timer is to be extended or reduced, the 11th identification information included in the configuration update command may indicate that congestion for the S-NSSAI has not been solved, may indicate that the UE cannot transmit the MM message and/or the SM message for the S-NSSAI, or may indicate that the UE cannot transmit the MM message and/or the SM message for the S-NSSAI because congestion for the S-NSSAI is not solved.

In a case that the running back-off timer is to be stopped, the 11th identification information included in the configuration update command may indicate that congestion for the default S-NSSAI has been solved, may indicate that the UE can transmit the MM message and/or the SM message for no NSSAI, or may indicate that the UE can transmit the MM message and/or the SM message for no NSSAI because congestion for the default S-NSSAI is solved. Further, in a case that the running back-off timer is to be stopped, the 11th identification information included in the configuration update command may indicate that congestion for no NSSAI has been solved, or may indicate that the UE can transmit the MM message and/or the SM message for no NSSAI because congestion for no NSSAI is solved.

In a case that the running back-off timer is to be extended or reduced, the 11th identification information included in the configuration update command may indicate that congestion for the default S-NSSAI has not been solved, may indicate that the UE cannot transmit the MM message and/or the SM message for no NSSAI, or may indicate that the UE cannot transmit the MM message and/or the SM message for no NSSAI because congestion for the default S-NSSAI is not solved. Further, in a case that the running back-off timer is to be extended or reduced, the 11th identification information included in the configuration update command may indicate that congestion for no NSSAI has not been solved, or may indicate that the UE cannot transmit the MM message and/or the SM message for no NSSAI because congestion for no NSSAI is not solved.

In a case that the running back-off timer is to be stopped, the network need not include the 12th identification information in the configuration update command. In contrast, in a case that the running back-off timer is to be extended or reduced, the network may include the 12th identification information indicating a new value in the configuration update command.

14th identification information (specific S-NSSAI) included in the configuration update command may be the same as the S-NSSAI indicated by the 14th identification information transmitted and/or received in the registration accept message in the registration procedure of section 3.2. Note that it is preferable that the 14th identification information included in the configuration update command be included in the Allowed NSSAI for transmission.

The 10th identification information included in the configuration update command may include the 11th identification information to the 15th identification information.

By receiving the configuration update command from the AMF via the access network (S900 of FIG. 8), the UE may be able to comprehend significance of each piece of identification information included in the configuration update command, and/or significance indicated by combining each piece of identification information.

Further, by receiving the configuration update command from the AMF via the access network, the UE may delete stored information. Further, by receiving the configuration update command from the AMF via the access network, the UE may store each piece of identification information included in the configuration update command.

Further, the UE may initiate the registration procedure, based on reception of the configuration update command. More specifically, the UE may initiate the registration procedure, based on reception of the configuration update command including information indicating that the registration procedure is requested to be performed.

Further, the UE may initiate the PDU session establishment procedure, based on reception of the configuration update command. More specifically, the UE may initiate the PDU session establishment procedure, based on reception of the configuration update command including information indicating that the PDU session establishment procedure is requested to be performed.

By transmitting and/or receiving the configuration update command from the AMF via the access network while having the back-off timer run, the UE and the core network apparatus (for example, the AMF) can extend or reduce or stop the back-off timer before expiration of the back-off timer.

Specifically, the UE may stop the running back-off timer, based on reception of the configuration update command not including the 12th identification information. In contrast, the UE may stop the running back-off timer, may start the back-off timer with the 12th identification information, or may perform the both, based on reception of the configuration update command including the 12th identification information.

In a case that the UE stops the back-off timer, the UE may transmit the MM message and/or the SM message for a specific network slice. Specifically, the registration request message and/or the PDU session establishment request message including the same S-NSSAI as the 10th identification information (S-NSSAI) or the 14th identification information included in the registration request message of section 3.2 may be transmitted.

In a case that the UE extends or reduces the back-off timer, the UE cannot transmit the MM message and/or the SM message for a specific network slice while the back-off timer is running; however, in a case that the back-off timer expires, or the UE stops the back-off timer using the procedure of one of section 3.2.2 to section 3.2.5, as described in the above, the UE may transmit the MM message and/or the SM message for the specific network slice.

3.2.3. Update Procedure Using Paging Procedure

The present procedure is initiated by the AMF transmitting a paging request (Request paging) to the access network (S900 of FIG. 8). The access network that has received the paging request transmits Paging to the UE. Note that the paging request and/or the paging may include at least a part of the 10th identification information to the 15th identification information.

Further, the paging request and/or the paging may include information indicating whether or not the registration procedure and/or the PDU session establishment procedure is requested to be performed. Further, the paging request and/or the paging may include information indicating whether or not a response to the paging request and/or the paging is requested.

Each apparatus including the UE can change the back-off timer value by transmitting and/or receiving the paging request and/or the paging including at least a part of the 10th identification information to the 15th identification information.

After stopping the back-off timer, each apparatus including the UE may be in a state of being capable of transmitting the MM message and/or the SM message for a specific network slice.

In a case that each apparatus including the UE extends or reduces the back-off timer, each apparatus including the UE may be in a state of not being capable of transmitting the MM message and/or the SM message for a specific network slice.

Further, the behavior of each apparatus including the UE in a case that the back-off timer expires may be the behavior similar to that in a case that the back-off timer stops.

Here, the 11th identification information included in the paging request and/or the paging may be the same as or may be different from the 11th identification information transmitted and/or received in the registration accept message in the registration procedure of section 3.2.

For example, the 11th identification information included in the paging request and/or the paging may indicate that congestion for the S-NSSAI has been solved, may indicate that the UE can transmit the MM message and/or the SM message for the S-NSSAI, or may indicate that the UE can transmit the MM message and/or the SM message for the S-NSSAI because congestion for the S-NSSAI is solved.

The 11th identification information included in the paging request and/or the paging may indicate that congestion for the default S-NSSAI has been solved, may indicate that the UE can transmit the MM message and/or the SM message for no NSSAI, or may indicate that the UE can transmit the MM message and/or the SM message for no NSSAI because congestion for the default S-NSSAI is solved. Further, the 11th identification information included in the paging request and/or the paging may indicate that congestion for no NSSAI has been solved, or may indicate that the UE can transmit the MM message and/or the SM message for no NSSAI because congestion for no NSSAI is solved.

The 12th identification information included in the paging request and/or the paging may be different from the back-off timer value indicated by the 12th identification information transmitted and/or received in the registration accept message in the registration procedure of section 3.2.

For example, by configuring the back-off timer value indicated by the 12th identification information included in the paging request and/or the paging to 0, the running back-off timer may be stopped.

For example, by not including the 12th identification information in the paging request and/or the paging, the running back-off timer may be stopped.

Note that the 11th identification information and the 12th identification information included in the paging request and/or the paging may be associated with each other.

For example, in a case that the running back-off timer is to be stopped, the 11th identification information included in the paging request and/or the paging may indicate that congestion for the S-NSSAI has been solved, may indicate that the UE can transmit the MM message and/or the SM message for the S-NSSAI, or may indicate that the UE can transmit the MM message and/or the SM message for the S-NSSAI because congestion for the S-NSSAI is solved.

In a case that the running back-off timer is to be stopped, the 11th identification information included in the paging request and/or the paging may indicate that congestion for the default S-NSSAI has been solved, may indicate that the UE can transmit the MM message and/or the SM message for no NSSAI, or may indicate that the UE can transmit the MM message and/or the SM message for no NSSAI because congestion for the default S-NSSAI is solved. Further, in a case that the running back-off timer is to be stopped, the 11th identification information included in the paging request and/or the paging may indicate that congestion for no NSSAI has been solved, or may indicate that the UE can transmit the MM message and/or the SM message for no NSSAI because congestion for no NSSAI is solved.

In a case that the running back-off timer is to be stopped, the network need not include the 12th identification information in the paging request and/or the paging.

The 14th identification information (specific S-NSSAI) included in the paging request and/or the paging may be the same as the S-NSSAI indicated by the 14th identification information transmitted and/or received in the registration accept message in the registration procedure of section 3.2. Note that it is preferable that the 14th identification information included in the paging request and/or the paging be included in the Allowed NSSAI for transmission.

The 10th identification information included in the paging request and/or the paging may include the 11th identification information to the 15th identification information.

By receiving the paging request and/or the paging (S900 of FIG. 8), the UE may be able to comprehend significance of each piece of identification information included in the paging request and/or the paging, and/or significance indicated by combining each piece of identification information.

Further, by receiving the paging request and/or the paging from the AMF via the access network, the UE may delete stored information. Further, by receiving the paging request and/or the paging from the AMF via the access network, the UE may store each piece of identification information included in the paging request and/or the paging.

Further, the UE may initiate the registration procedure, based on reception of the paging request and/or the paging. More specifically, the UE may initiate the registration procedure, based on reception of the paging request and/or the paging including information indicating that the registration procedure is requested to be performed.

Further, the UE may initiate the registration procedure, based on reception of the paging request and/or the paging. More specifically, the UE may initiate the PDU session establishment procedure, based on reception of the paging request and/or the paging including information indicating that the PDU session establishment procedure is requested to be performed.

By transmitting and/or receiving the paging request and/or the paging while having the back-off timer run, the UE and the core network apparatus (for example, the AMF) can stop the back-off timer before expiration of the back-off timer.

Specifically, the UE may stop the running back-off timer, based on reception of the paging request and/or the paging not including the 12th identification information.

In a case that the UE stops the back-off timer, the UE may transmit the MM message and/or the SM message for the specific network slice. Specifically, the registration request message and/or the PDU session establishment request message including the same S-NSSAI as the 10th identification information (S-NSSAI) or the 14th identification information included in the registration request message of section 3.2 may be transmitted.

3.2.4. Update Procedure Using Notification Procedure

The present procedure is initiated by the AMF transmitting the Notification message to the UE (S900 of FIG. 8). The notification message may include at least a part of the 10th identification information to the 15th identification information.

Further, the notification message may include information indicating whether or not the registration procedure and/or the PDU session establishment procedure is requested to be performed. Further, the notification message may include information indicating whether or not a response to the notification message is requested.

Each apparatus including the UE can change the back-off timer value by transmitting and/or receiving the notification message including at least a part of the 10th identification information to the 15th identification information.

After stopping the back-off timer, each apparatus including the UE may be in a state of being capable of transmitting the MM message and/or the SM message for a specific network slice.

In a case that each apparatus including the UE extends or reduces the back-off timer, each apparatus including the UE may be in a state of not being capable of transmitting the MM message and/or the SM message for a specific network slice.

Further, the behavior of each apparatus including the UE in a case that the back-off timer expires may be the behavior similar to that in a case that the back-off timer stops.

Here, the 11th identification information included in the notification message may be the same as or may be different from the 11th identification information transmitted and/or received in the registration accept message in the registration procedure of section 3.2.

For example, the 11th identification information included in the notification message may indicate that congestion for the S-NSSAI has been solved, may indicate that the UE can transmit the MM message and/or the SM message for the S-NSSAI, or may indicate that the UE can transmit the MM message and/or the SM message for the S-NSSAI because congestion for the S-NSSAI is solved.

The 11th identification information included in the notification message may indicate that congestion for the default S-NSSAI has been solved, may indicate that the UE can transmit the MM message and/or the SM message for no NSSAI, or may indicate that the UE can transmit the MM message and/or the SM message for no NSSAI because congestion for the default S-NSSAI is solved. Further, the 11th identification information included in the notification message may indicate that congestion for no NSSAI has been solved, or may indicate that the UE can transmit the MM message and/or the SM message for no NSSAI because congestion for no NSSAI is solved.

The 12th identification information included in the notification message may be different from the back-off timer value indicated by the 12th identification information transmitted and/or received in the registration accept message in the registration procedure of section 3.2.

For example, by configuring the back-off timer value indicated by the 12th identification information included in the notification message to 0, the running back-off timer may be stopped.

For example, by not including the 12th identification information in the notification message, the running back-off timer may be stopped.

Note that the 11th identification information and the 12th identification information included in the notification message may be associated with each other.

For example, in a case that the running back-off timer is to be stopped, the 11th identification information included in the notification message may indicate that congestion for the S-NSSAI has been solved, may indicate that the UE can transmit the MM message and/or the PDU session establishment procedure for the S-NSSAI, or may indicate that the UE can transmit the MM message and/or the PDU session establishment procedure for the S-NSSAI because congestion for the S-NSSAI is solved.

In a case that the running back-off timer is to be stopped, the 11th identification information included in the notification message may indicate that congestion for the default S-NSSAI has been solved, may indicate that the UE can transmit the MM message and/or the SM message for no NSSAI, or may indicate that the UE can transmit the MM message and/or the SM message for no NSSAI because congestion for the default S-NSSAI is solved. Further, in a case that the running back-off timer is to be stopped, the 11th identification information included in the notification message may indicate that congestion for no NSSAI has been solved, or may indicate that the UE can transmit the MM message and/or the SM message for no NSSAI because congestion for no NSSAI is solved.

In a case that the running back-off timer is to be stopped, the network need not include the 12th identification information in the notification message.

The 14th identification information (specific S-NSSAI) included in the notification message may be the same as the S-NSSAI indicated by the 14th identification information transmitted and/or received in the registration accept message in the registration procedure of section 3.2. Note that it is preferable that the 14th identification information included in the notification message be included in the Allowed NSSAI for transmission.

The 10th identification information included in the notification message may include the 11th identification information to the 15th identification information.

By receiving the notification message (S900 of FIG. 8), the UE may be able to comprehend significance of each piece of identification information included in the notification message, and/or significance indicated by combining each piece of identification information.

Further, by receiving the notification message from the AMF via the access network, the UE may delete stored information. Further, by receiving the notification message from the AMF via the access network, the UE may store each piece of identification information included in the notification message.

Further, the UE may initiate the registration procedure, based on reception of the notification message. More specifically, the UE may initiate the registration procedure, based on reception of the notification message including information indicating that the registration procedure is requested to be performed.

Further, the UE may initiate the PDU session establishment procedure, based on reception of the notification message. More specifically, the UE may initiate the PDU session establishment procedure, based on reception of the notification message including information indicating that the PDU session establishment procedure is requested to be performed.

By transmitting and/or receiving the notification message while having the back-off timer run, the UE and the core network apparatus (for example, the AMF) can stop the back-off timer before expiration of the back-off timer.

Specifically, the UE may stop the running back-off timer, based on reception of the notification message not including the 12th identification information.

In a case that the UE stops the back-off timer, the UE may transmit the MM message and/or the SM message for a specific network slice. Specifically, the registration request message and/or the PDU session establishment request message including the same S-NSSAI as the 10th identification information (S-NSSAI) or the 14th identification information included in the registration request message of section 3.2 may be transmitted.

3.2.5. Update Procedure Using Network-Initiated De-Registration Procedure

The present procedure is initiated by the AMF transmitting the de-registration request message (Deregistration request message) to the UE (S900 of FIG. 8). The de-registration request message may include at least a part of the 10th identification information to the 15th identification information.

Further, the de-registration request message may include information indicating whether or not the registration procedure and/or the PDU session establishment procedure is requested to be performed. Further, the de-registration request message may include information indicating whether or not a response to the de-registration request message is requested.

Each apparatus including the UE can change the back-off timer value by transmitting and/or receiving the de-registration request message including at least a part of the 10th identification information to the 15th identification information.

After stopping the back-off timer, each apparatus including the UE may be in a state of being capable of transmitting the MM message and/or the SM message for a specific network slice.

In a case that each apparatus including the UE extends or reduces the back-off timer, each apparatus including the UE may be in a state of not being capable of transmitting the MM message and/or the SM message for a specific network slice.

Further, the behavior of each apparatus including the UE in a case that the back-off timer expires may be the behavior similar to that in a case that the back-off timer stops.

Here, the 11th identification information included in the de-registration request message may be the same as or may be different from the 11th identification information transmitted and/or received in the registration accept message in the registration procedure of section 3.2.

For example, the 11th identification information included in the de-registration request message may indicate that congestion for the S-NSSAI has been solved, may indicate that the UE can transmit the MM message and/or the PDU session establishment procedure for the S-NSSAI, or may indicate that the UE can transmit the MM message and/or the PDU session establishment procedure for the S-NSSAI because congestion for the S-NSSAI is solved.

The 11th identification information included in the de-registration request message may indicate that congestion for the default S-NSSAI has been solved, may indicate that the UE can transmit the MM message and/or the SM message for no NSSAI, or may indicate that the UE can transmit the MM message and/or the SM message for no NSSAI because congestion for the default S-NSSAI is solved. Further, the 11th identification information included in the de-registration request message may indicate that congestion for no NSSAI has been solved, or may indicate that the UE can transmit the MM message and/or the SM message for no NSSAI because congestion for no NSSAI is solved.

The 12th identification information included in the de-registration request message may be different from the back-off timer value indicated by the 12th identification information transmitted and/or received in the registration accept message in the registration procedure of section 3.2.

For example, by configuring the back-off timer value indicated by the 12th identification information included in the de-registration request message to 0, the running back-off timer may be stopped.

For example, by not including the 12th identification information in the de-registration request message, the running back-off timer may be stopped.

Note that the 11th identification information and the 12th identification information included in the de-registration request message may be associated with each other.

For example, in a case that the running back-off timer is to be stopped, the 11th identification information included in the de-registration request message may indicate that congestion for the S-NSSAI has been solved, may indicate that the UE can transmit the MM message for the S-NSSAI, or may indicate that the UE can transmit the MM message for the S-NSSAI because congestion for the S-NSSAI is solved.

In a case that the running back-off timer is to be stopped, the 11th identification information included in the de-registration request message may indicate that congestion for the default S-NSSAI has been solved, may indicate that the UE can transmit the MM message and/or the SM message for no NSSAI, or may indicate that the UE can transmit the MM message and/or the SM message for no NSSAI because congestion for the default S-NSSAI is solved. Further, in a case that the running back-off timer is to be stopped, the 11th identification information included in the de-registration request message may indicate that congestion for no NSSAI has been solved, or may indicate that the UE can transmit the MM message for no NSSAI because congestion for no NSSAI is solved.

In a case that the running back-off timer is to be stopped, the network need not include the 12th identification information in the de-registration request message.

The 14th identification information (specific S-NSSAI) included in the de-registration request message may be the same as the S-NSSAI indicated by the 14th identification information transmitted and/or received in the registration accept message in the registration procedure of section 3.2. Note that it is preferable that the 14th identification information included in the de-registration request message be included in the Allowed NSSAI for transmission.

The 10th identification information included in the de-registration request message may include the 11th identification information to the 15th identification information.

By receiving the de-registration request message (S900 of FIG. 8), the UE may be able to comprehend significance of each piece of identification information included in the de-registration request message, and/or significance indicated by combining each piece of identification information.

Further, by receiving the de-registration request message from the AMF via the access network, the UE may delete stored information. Further, by receiving the de-registration request message from the AMF via the access network, the UE may store each piece of identification information included in the de-registration request message.

Further, the UE may initiate the registration procedure, based on reception of the de-registration request message. More specifically, the UE may initiate the registration procedure, based on reception of the de-registration request message including information indicating that the registration procedure is requested to be performed.

By transmitting and/or receiving the de-registration request message while having the back-off timer run, the UE and the core network apparatus (for example, the AMF) can stop the back-off timer before expiration of the back-off timer.

Specifically, the UE may stop the running back-off timer, based on reception of the de-registration request message not including the 12th identification information.

In a case that the UE stops the back-off timer, the UE may transmit the MM message and/or the SM message for a specific network slice. Specifically, the registration request message and/or the PDU session establishment request message including the same S-NSSAI as the 10th identification information (S-NSSAI) or the 14th identification information included in the registration request message of section 3.2 may be transmitted.

3.2.6. Combination of Update Procedures

As described above, section 3.2.2 to section 3.2.5 describe the update procedure in which, by performing the registration procedure described in section 3.2, each apparatus including the UE completes registration with the network or a specific network slice, but the back-off timer is configured, and for extending or reducing or stopping the back-off timer before expiration of the back-off timer.

However, the update procedure is not necessarily performed only once, and may be performed multiple times. In this case, update may be continuously performed using any one update procedure, or update may be continuously performed using a different update procedure every time.

3.3. PDU Session Establishment Procedure

Figure 7:
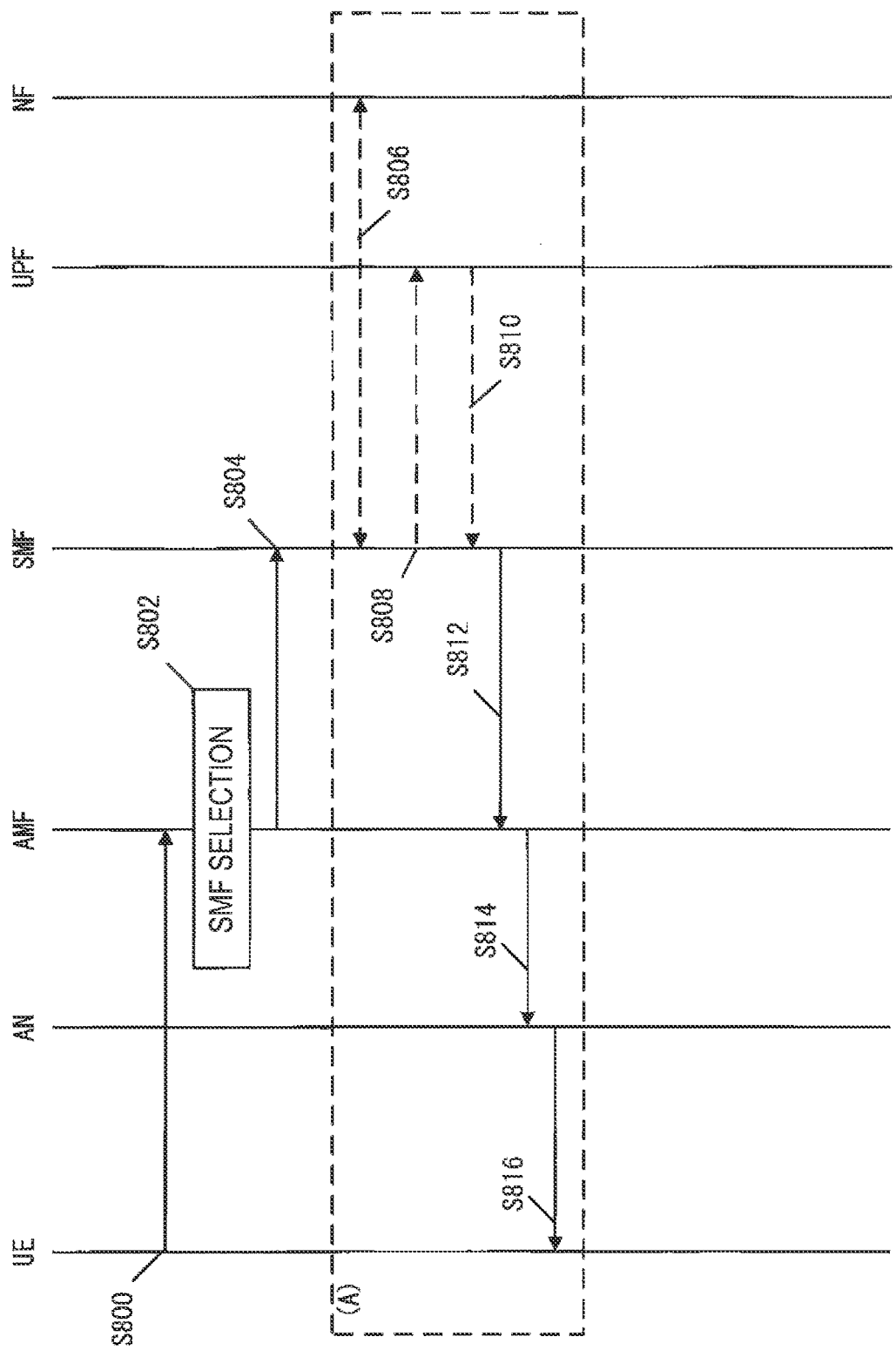
FIG. 7 is a diagram illustrating a PDU session establishment procedure.

Next, the PDU session establishment procedure performed via 3GPP access will be described with reference to FIG. 7. The present procedure may be performed after performing the registration procedure of section 3.2 and/or the update procedure of sections 3.2.2 to 3.2.5 one or more times.

First, by transmitting the NAS message including an N1 SM container including the PDU session establishment request message to the AMF via the access network (S800), the UE initiates the PDU session establishment procedure. The NAS message may be, for example, a message transmitted via the N1 interface, and may be an uplink NAS transport (UL NAS TRANSPORT) message.

Here, although the access network refers to 3GPP access or non-3GPP access, the following description will be given by taking an example of a case of 3GPP access. In other words, the UE transmits the NAS message to the AMF via the base station apparatus included in 3GPP access.

The UE can notify the network side of what is requested by the UE by including at least one piece out of the 1st identification information to the 5th identification information in the PDU session establishment request message, and/or the N1 SM container, and/or the NAS message for transmission.

Here, the 1st identification information to the 4th identification information may be as described in section 2.6.

Note that the UE may select and determine whether or not to transmit the 1st identification information to the 5th identification information to the network, based on the capability information of the UE, and/or the UE policy, and/or the state of the UE, and/or the registration information of the user, and/or the context stored by the UE, and/or the like.

In a case that the UE includes the function for management of the maximum number of UEs connected to a slice, or requests at least one S-NSSAI that requires management for management of the maximum number of UEs connected to a slice, the UE may transmit the 2nd identification information. By transmitting the 2nd identification information, the UE may notify the network of inclusion of the function of storing the first NSSAI.

In a case that the UE includes the function for management of the maximum number of PDU sessions connected to a slice, or requests at least one S-NSSAI that requires management for management of the maximum number of PDU sessions connected to a slice, the UE may transmit the 3rd identification information. By transmitting the 3rd identification information, the UE may notify the network of inclusion of the function of storing the first NSSAI.

Note that the UE may include the 1st identification information to the 5th identification information in a control message of a layer (for example, a Radio Resource Control (RRC) layer, a Medium Access Control (MAC) layer, a Radio Link Control (RLC) layer, a Packet Data Convergence Protocol (PDCP) layer, or the like) that is lower than the NAS layer and a control message of a layer (for example, a transport layer, a session layer, a presentation layer, an application layer, or the like) that is higher than the NAS layer for transmission.

Next, in a case that the AMF receives the NAS message, the AMF can recognize what is requested by the UE, and/or details of information and the like (a message, a container, information) included in the NAS message.

Next, the AMF selects the SMF as a transfer destination of at least a part of the information and the like (a message, a container, information) included in the NAS message received from the UE (S802). Note that the AMF may select the SMF being a transfer destination, based on the information and the like (a message, a container, information) included in the NAS message, and/or the subscriber information, and/or the capability information of the network, and/or the UE policy, and/or the operator policy, and/or the state of the network, and/or the registration information of the user, and/or the context stored by the AMF, and/or the like.

Further, for example, the AMF may select the SMF including the function for management of the maximum number of UEs connected to a slice, and/or the SMF having connectivity to the network including the function for management of the maximum number of PDU sessions connected to a slice, based on the 3rd identification information. Here, it is assumed that the SMF #220 is selected.

Next, the AMF transmits at least a part of the information and the like (a message, a container, information) included in the NAS message received from the UE to the selected SMF via the N11 interface, for example (S804).

Next, in a case that the SMF receives information and the like (a message, a container, information) transmitted from the AMF, the SMF can recognize what is requested by the UE, and/or details of the information and the like (a message, a container, information) received from the AMF.

Here, the SMF may perform the second condition fulfillment determination. The second condition fulfillment determination may be for determining whether or not the request of the UE is accepted. In the second condition fulfillment determination, the SMF determines whether the second condition fulfillment determination is true or false. In a case that the SMF determines that the second condition fulfillment determination is true, the SMF may initiate the procedure of (A) of FIG. 7, whereas in a case that the SMF determines that the second condition fulfillment determination is false, the SMF may initiate the procedure of rejecting the request of the UE.

Note that the second condition fulfillment determination may be performed by a network function (also referred to as an NF) other than the SMF. The NF may be, for example, a Network Slice Selection Function (NSSF), a Network Data Analytics Function (NWDAF), a Policy Control Function (PCF), a Network Slice Quota (NSQ), or a Network Repository Function (NRF). In a case that the NF other than the SMF performs the second condition fulfillment determination, the SMF may provide the NF with at least a part of information necessary for performing the second condition fulfillment determination, specifically, information received from the UE. Then, in a case that the NF determines true or false of the second condition fulfillment determination based on the information received from the SMF, the NF may notify the SMF of information including results (in other words, true or false) of the second condition fulfillment determination. The SMF may determine the identification information and/or the control message to be transmitted to the UE, based on the results of the second condition fulfillment determination received from the NF. Here, the control message may refer to the PDU session establishment accept message or a PDU session establishment reject message.

Note that the second condition fulfillment determination may be performed based on the information and the like (a message, a container, information) received from the AMF, and/or the subscriber information (subscription information), and/or the capability information of the network, and/or the UE policy, and/or the operator policy, and/or the state of the network, and/or the registration information of the user, and/or the context stored by the SMF, and/or the like.

For example, in a case that the network allows the request of the UE, the second condition fulfillment determination may be determined as true, whereas in a case that the network does not allow the request of the UE, the second condition fulfillment determination may be determined as false. In a case that a network as a connection destination of the UE and/or an apparatus in the network supports the function requested by the UE, the second condition fulfillment determination may be determined as true, whereas in a case that the network and/or the apparatus does not support the function requested by the UE, the second condition fulfillment determination may be determined as false. In a case that the transmitted and/or received identification information is allowed, the second condition fulfillment determination may be determined as true, whereas in a case that the transmitted and/or received identification information is not allowed, the second condition fulfillment determination may be determined as false.

In a case that the S-NSSAI included in the requested NSSAI received by the SMF from the UE is information for identifying a slice that requires management of the maximum number of PDU sessions connected to a slice, and further, in a case that the number of PDU sessions connected to the slice does not reach the maximum number of PDU sessions, the second condition fulfillment determination may be true. Note that, in a case that the S-NSSAI included in the requested NSSAI received by the SMF from the UE is information for identifying a slice that requires management of the maximum number of PDU sessions connected to a slice, the second condition fulfillment determination may be invariably true.

Note that the condition for determining true or false of the second condition fulfillment determination need not necessarily be limited to the condition described above.

Next, each step of the procedure of (A) of FIG. 7 will be described.

First, the SMF may select the PCF. For example, the SMF may select an appropriate PCF, based on received identification information. Here, it is assumed that the PCF #250 is selected.

Next, the SMF may transmit at least a part of the information and the like (a message, a container, information) received from the AMF to the PCF (S806).

Next, in a case that the PCF receives the information and the like (a message, a container, information) transmitted from the SMF, the PCF can recognize details of those.

The PCF may generate a PCC rule. Further, in a case that the PCF generates the PCC rule, the PCF may transmit the generated PCC rule to the SMF.

Next, in a case that the SMF receives the information transmitted from the PCF, the SMF can recognize details of those pieces of information.

Next, the SMF selects the UPF for a PDU session to be established, and transmits an N4 session establishment request message to the selected UPF via the N4 interface, for example (S808).

Here, the SMF may select one or more UPFs, based on the information and the like (a message, a container, information) received from the AMF, and/or the information received from the PCF, and/or the subscriber information, and/or the capability information of the network, and/or the UE policy, and/or the operator policy, and/or the state of the network, and/or the registration information of the user, and/or the context stored by the SMF, and/or the like. In a case that multiple UPFs are selected, the SMF may transmit the N4 session establishment request message to each UPF.

Here, it is assumed that the UPF #230 is selected.

Next, in a case that the UPF receives the N4 session establishment request message (S808), the UPF can recognize details of the information received from the SMF.

The UPF may transmit an N4 session establishment response message to the SMF via the N4 interface, for example, based on reception of the N4 session establishment request message (S810).

Next, in a case that the SMF receives the N4 session establishment response message as a response message to the N4 session establishment request message, the SMF can recognize details of the information received from the UPF.

Next, the SMF transmits the N1 SM container, and/or N2 SM information, and/or the PDU session ID to the AMF via the N11 interface, for example, based on reception of the PDU session establishment request message, and/or selection of the UPF, and/or reception of the N4 session establishment response message, and/or the like (S812). Here, the N1 SM container may include the PDU session establishment accept message.

Next, the AMF that has received the N1 SM container, and/or the N2 SM information, and/or the PDU session ID transmits the NAS message to the UE via the access network (S814) (S816). Here, the NAS message is transmitted via the N1 interface, for example. The NAS message may be a downlink NAS transport (DL NAS TRANSPORT) message.

Specifically, in a case that the AMF transmits an N2 PDU session request message to the access network (S814), the access network that has received the N2 PDU session request message transmits the NAS message to the UE (S816). Here, the N2 PDU session request message may include the NAS message and/or the N2 SM information. The NAS message may include the PDU session ID and/or the N1 SM container. Here, the access network refers to 3GPP access. In other words, the AMF transmits the NAS message to the UE via the base station apparatus #110 included in 3GPP access.

The PDU session establishment accept message may be a response message to the PDU session establishment request. The PDU session establishment accept message may indicate that establishment of the PDU session has been accepted.

Here, by transmitting the PDU session establishment accept message, and/or the N1 SM container, and/or the PDU session ID, and/or the NAS message, and/or the N2 SM information, and/or the N2 PDU session request message, the SMF and/or the AMF may indicate that at least a part of the request of the UE by the PDU session establishment request message has been accepted.

Here, the SMF and/or the AMF may include at least one piece out of the 10th identification information to the 18th identification information in the PDU session establishment accept message, and/or the N1 SM container, and/or the NAS message, and/or the N2 SM information, and/or the N2 PDU session request message for transmission.

Here, the 10th identification information to the 18th identification information may be as described in section 2.6.

Note that, by transmitting these pieces of identification information and/or the PDU session establishment accept message, the SMF may indicate that the network supports each function, may indicate that the request of the UE has been accepted, may indicate that the request from the UE is not allowed, or may indicate information of a combination of these. Further, in a case that multiple pieces of identification information are transmitted and/or received, two or more pieces of identification information of these pieces of identification information may be configured as one or more pieces of identification information. Note that information indicating support of each function and information indicating the request of use of each function may be transmitted and/or received as the same piece of identification information, or may be transmitted and/or received as different pieces of identification information.

In a case that the SMF receives at least one piece out of the 1st identification information to the 5th identification information from the UE, the SMF may include at least one piece of identification information out of the 10th identification information to the 18th identification information in the PDU session establishment accept message for transmission.

The SMF may include the configured NSSAI, and/or the allowed NSSAI, and/or the rejected NSSAI, and/or the pending NSSAI in the PDU session establishment accept message for transmission. Note that the 10th identification information to the 18th identification information may be transmitted in the allowed NSSAI, and/or the rejected NSSAI, and/or the pending NSSAI, or may be transmitted as information different from these.

In a case that the S-NSSAI included in the requested NSSAI received from the UE is information for identifying a slice that requires management of the maximum number of PDU sessions connected to a slice, and further, in a case that the number of UEs connected to the slice reaches the maximum number of PDU sessions, the SMF may include the 10th identification information to the 18th identification information in the PDU session establishment accept message.

The 16th identification information may be the same as the 4th identification information.

Note that the SMF and/or the AMF may include the 10th identification information to the 18th identification information in a control message of a layer (for example, an RRC layer, an MAC layer, an RLC layer, a PDCP layer, or the like) that is lower than the NAS layer and a control message of a layer (for example, a transport layer, a session layer, a presentation layer, an application layer, or the like) that is higher than the NAS layer for transmission.

By transmitting at least one of these pieces of identification information, the SMF and/or the AMF can notify the UE of details of these pieces of identification information.

Note that the SMF and/or the AMF may select and determine which piece of identification information is to be included in the PDU session establishment accept message, and/or the N1 SM container, and/or the NAS message, and/or the N2 SM information, and/or the N2 PDU session request message, based on each piece of received identification information, and/or the subscriber information, and/or the capability information of the network, and/or the UE policy, and/or the operator policy, and/or the state of the network, and/or the registration information of the user, and/or the context stored by the SMF and/or the AMF, and/or the like.

Next, in a case that the UE receives the NAS message via the N1 interface, for example (S816), the UE can recognize that the request of the UE by the PDU session establishment request message has been accepted, and/or details of the information and the like (a message, a container, information) included in the NAS message.

The UE may recognize the received information, based on reception of at least one piece of information out of the 10th identification information to the 18th identification information. Specifically, the UE may recognize that the UE is in a state in which the UE is temporarily prohibited from performing transmission of the MM message and/or transmission of the SM message using the S-NSSAI indicated by the 10th identification information, and/or the S-NSSAI indicated by the 14th identification information, and/or the S-NSSAI related to the mapped S-NSSAI indicated by the 15th identification information, for the reason that the number has reached the maximum number of PDU sessions connected for each slice. Note that, here, the MM procedure may be the registration request message, and the SM message may be the PDU session establishment request message.

The UE may perform the following operation for each piece of 10th identification information, based on reception of at least one or more pieces of information out of the 10th identification information to the 18th identification information, and/or reception of the PDU session establishment accept message.

The UE may store the S-NSSAI indicated by the 10th identification information, and/or the S-NSSAI indicated by the 14th identification information, and/or the S-NSSAI related to the mapped S-NSSAI indicated by the 15th identification information in an appropriate first NSSAI. Specifically, the UE may add the received S-NSSAI indicated by the 14th identification information to the first NSSAI that is associated with information indicated by the 11th identification information and/or the 13th identification information.

Alternatively, the UE may add the received mapped S-NSSAI indicated by the 15th identification information to the first NSSAI, may add the S-NSSAI related to the received mapped S-NSSAI indicated by the 15th identification information to the first NSSAI associated with the current PLMN, may add to the first NSSAI associated with the current PLMN and the current access type, or may add to the first NSSAI(s) associated with the current PLMN and all of the access types.

Further, in a case that the S-NSSAI included in the first NSSAI stored by the UE is included in the allowed NSSAI associated with the PLMN and the access type requested by the UE in the present procedure and other access types being stored by the UE, the S-NSSAI may be deleted from the allowed NSSAI.

Further, in a case that the UE receives the 15th identification information, the UE may store the S-NSSAI indicated by the 15th identification information as the mapped S-NSSAI of the S-NSSAI indicated by the 14th identification information.

In a case that the received 13th identification information is information indicating adaptation to all of the PLMNs, the UE may delete the S-NSSAI related to the mapped S-NSSAI indicated by the 15th identification information from the allowed NSSAI corresponding to the PLMN other than the current PLMN.

The UE may recognize that the S-NSSAI indicated by the 10th identification information has reached the maximum number of PDU sessions connected for each slice, based on reception of the 10th identification information and/or the 11th identification information, and/or reception of the PDU session establishment accept message. Here, the S-NSSAI indicated by the 10th identification information may be the S-NSSAI indicated by the 14th identification information and/or the mapped S-NSSAI indicated by the 15th identification information.

The UE may start count of the back-off timer associated with the S-NSSAI or the back-off timer, or may manage the back-off timer by using the received value of the back-off timer, based at least on reception of one or more pieces of information out of the 10th identification information to the 18th identification information and/or reception of the PDU session establishment accept message. Here, the value of the back-off timer may be a value of the timer indicated by the 10th identification information and/or the 12th identification information, and the S-NSSAI may be the 1st identification information, and/or the 10th identification information, and/or the S-NSSAI indicated by the 14th identification information, and/or the mapped S-NSSAI indicated by the 15th identification information.

While the back-off timer is running, the UE may be in a state in which the UE is prohibited from performing transmission of the MM message and/or the SM message using the S-NSSAI associated with the back-off timer, or the mapped S-NSSAI associated with the back-off timer, or the S-NSSAI related to the mapped S-NSSAI associated with the back-off timer.

Further, in a case that the UE receives the 13th identification information, the UE may adapt the back-off timer according to the effective range indicated by the 13th identification information.

Specifically, in a case that the 13th identification information is information indicating adaptation in the current PLMN, the UE may adapt the back-off timer in the current PLMN. Specifically, due to a change of the PLMN (PLMN change), although the UE need not stop count of the back-off timer or the back-off timer, regulation by the back-off timer associated with the PLMN before movement may be canceled. In other words, in a case that the PLMN is changed, although the UE maintains the back-off timer, regulation for the PLMN before movement may be canceled.

Alternatively, due to a change of the PLMN, the UE may stop count of the back-off timer associated with the current PLMN or the back-off timer. In other words, in a case that the PLMN is changed, the UE may stop the back-off timer, and regulation for the PLMN before movement may be canceled.

Alternatively, in a case that the 13th identification information is information indicating adaptation to all of the PLMNs, the UE may adapt the back-off timer in all of the PLMNs. In other words, even in a case that a change of the PLMN occurs, the UE may maintain the back-off timer instead of stopping the back-off timer. In a case that a change of the PLMN occurs while the back-off timer is running, the UE may maintain the state in which the UE is prohibited from performing transmission of the MINI message and/or the SM message using the S-NSSAI of a movement destination PLMN associated with the mapped S-NSSAI of the S-NSSAI that has been associated with the back-off timer, or the S-NSSAI of the movement destination PLMN related to the mapped S-NSSAI, or the mapped S-NSSAI.

Alternatively, in a case that the 13th identification information is information indicating adaptation in the current registration area, the UE may adapt the back-off timer in the current registration area. In other words, due to the UE exiting from the registration area, the UE may stop count of the back-off timer or the back-off timer.

Further, the UE may manage and/or store the first NSSAI associated with the 11th identification information and/or the 13th identification information.

Here, due to stop or expiration of the back-off timer, restriction may be canceled, and the UE may transition to a state in which the UE can transmit the MINI message and/or the SM message using the S-NSSAI that has been associated with the back-off timer, and/or the S-NSSAI related to the mapped S-NSSAI that has been associated with the back-off timer, and/or the mapped S-NSSAI that has been associated with the back-off timer. In other words, due to stop or expiration of the back-off timer, the UE may transition to a state in which the UE can perform transmission of the MM message and/or the SM message using the S-NSSAI that has been associated with the back-off timer, and/or the S-NSSAI related to the mapped S-NSSAI that has been associated with the back-off timer, and/or the mapped S-NSSAI that has been associated with the back-off timer as the Requested NSSAI.

Further, due to stop or expiration of the back-off timer, the UE may transition to a state in which the UE can perform transmission of the MM message and/or the SM message using the NSSAI that has been associated with the back-off timer. In other words, due to stop or expiration of the back-off timer, the UE may transition to a state in which the UE can perform transmission of the MM message and/or the SM message using the NSSAI that has been associated with the back-off timer as the Requested NSSAI.

Further, due to stop or expiration of the back-off timer, the UE may delete the S-NSSAI that has been associated with the back-off timer, or the mapped S-NSSAI that has been associated with the back-off timer, or the S-NSSAI related to the mapped S-NSSAI that has been associated with the back-off timer from the first NSSAI.

By transmitting and/or receiving the PDU session establishment accept message including at least a part of the 10th identification information to the 18th identification information, each apparatus including the UE may be in a state of conditionally having successfully established a PDU session with a specific network slice. Here, the state of conditionally having successfully established a PDU session with a specific network slice may be a state in which each apparatus including the UE establishes a PDU session, but QoS lower than that of a case without congestion is applied as the QoS applied to the PDU session. Here, one example of the QoS may be a bit rate. In other words, each apparatus including the UE may be in a state in which each apparatus including the UE establishes a PDU session to which a low bit rate is applied, which is indicated by a data rate indicated by the 18th identification information. Further, the UE and the core network apparatus (for example, the SMF) may be in a state of having the back-off timer started. Further, the UE and the core network apparatus (for example, the SMF) may be in a state of not being capable of transmitting the MM message and/or the SM message for the same network slice while performing the back-off timer. Further, the UE and the core network apparatus (for example, the SMF) may be in a state of being capable of transmitting the MM message and/or the SM message for the same network slice after the back-off timer expires. In a case that the back-off timer expires, each apparatus including the UE may continuously apply the data rate applied to the PDU session and the data rate indicated by the 18th identification information, or may configure to the data rate indicated by the 17th identification information.

Note that each type of processing performed by the UE based on reception of each piece of identification information described above may be performed during the present procedure or after completion of the present procedure or may be performed based on completion of the present procedure after completion of the present procedure.

3.3.1. Update Procedure

By performing the PDU session establishment procedure of section 3.3, each apparatus including the UE may be in a state of conditionally having successfully established a PDU session with a specific network slice, may have the back-off timer running, and may be in a state in which low QoS is applied to the PDU session.

Further, the update procedure for the UE and the core network apparatus (for example, the SMF) to extend or reduce or stop the back-off timer before expiration of the back-off timer will be described.

The update procedure may include a PDU session modification procedure. Note that the update procedure using the PDU session modification procedure will be described in section 3.3.2.

3.3.2. Update Procedure Using PDU Session Modification Procedure

The present procedure is initiated by the SMF transmitting a PDU session modification command to the UE via the AMF and the access network (S900 of FIG. 8). Note that the PDU session modification command may include at least a part of the 10th identification information to the 18th identification information.

Further, the PDU session modification command may include information indicating whether or not the PDU session establishment procedure is requested to be performed. Further, the PDU session modification command may include information indicating whether or not a response to the PDU session modification command is requested.

Here, the 11th identification information included in the PDU session modification command may be the same as or may be different from the 11th identification information transmitted and/or received in the PDU session establishment accept message of section 3.3.

For example, the 11th identification information included in the PDU session modification command may indicate that congestion for the S-NSSAI has been solved, may indicate that the UE can transmit the MM message and/or the SM message for the S-NSSAI, or may indicate that the UE can transmit the MM message and/or the SM message for the S-NSSAI because congestion for the S-NSSAI is solved.

For example, the 11th identification information included in the PDU session modification command may indicate that congestion for the S-NSSAI has not been solved, may indicate that the UE cannot transmit the MM message and/or the SM message for the S-NSSAI, or may indicate that the UE cannot transmit the MM message and/or the SM message for the S-NSSAI because congestion for the S-NSSAI is not solved.

The 11th identification information included in the PDU session modification command may indicate that congestion for a default S-NSSAI has been solved, may indicate that the UE can transmit the MM message for no NSSAI, or may indicate that the UE can transmit the MM message and/or the SM message for no NSSAI because congestion for the default S-NSSAI is solved. Further, the 11th identification information included in the PDU session modification command may indicate that congestion for no NSSAI has been solved, or may indicate that the UE can transmit the MM message and/or the SM message for no NSSAI because congestion for no NSSAI is solved.

The 11th identification information included in the PDU session modification command may indicate that congestion for the default S-NSSAI has not been solved, may indicate that the UE cannot transmit the MM message and/or the SM message for no NSSAI, or may indicate that the UE cannot transmit the MM message and/or the SM message for no NSSAI because congestion for the default S-NSSAI is not solved. The 11th identification information included in the PDU session modification command may indicate that congestion for no NSSAI has not been solved, or may indicate that the UE cannot transmit the MM message and/or the SM message for no NSSAI because congestion for no NSSAI is not solved.

The 12th identification information included in the PDU session modification command may be the same as or may be different from the back-off timer value indicated by the 12th identification information transmitted and/or received in the PDU session establishment accept message of section 3.3.

For example, by configuring the back-off timer value indicated by the 12th identification information included in the PDU session modification command to 0, the running back-off timer may be stopped.

For example, by not including the 12th identification information in the PDU session modification command, the running back-off timer may be stopped.

For example, by configuring the back-off timer value indicated by the 12th identification information included in the PDU session modification command to a value other than 0, the running back-off timer may be extended or reduced.

Note that the 11th identification information and the 12th identification information included in the PDU session modification command may be associated with each other.

For example, in a case that the running back-off timer is to be stopped, the 11th identification information included in the PDU session modification command may indicate that congestion for the S-NSSAI has been solved, may indicate that the UE can transmit the MM message and/or the SM message for the S-NSSAI, or may indicate that the UE can transmit the MM message and/or the SM message for the S-NSSAI because congestion for the S-NSSAI is solved.

For example, in a case that the running back-off timer is to be extended or reduced, the 11th identification information included in the PDU session modification command may indicate that congestion for the S-NSSAI has not been solved, may indicate that the UE cannot transmit the MM message and/or the SM message for the S-NSSAI, or may indicate that the UE cannot transmit the MM message and/or the SM message for the S-NSSAI because congestion for the S-NSSAI is not solved.

In a case that the running back-off timer is to be stopped, the 11th identification information included in the PDU session modification command may indicate that congestion for the default S-NSSAI has been solved, may indicate that the UE can transmit the MM message and/or the SM message for no NSSAI, or may indicate that the UE can transmit the MM message and/or the SM message for no NSSAI because congestion for the default S-NSSAI is solved. Further, in a case that the running back-off timer is to be stopped, the 11th identification information included in the PDU session modification command may indicate that congestion for no NSSAI has been solved, or may indicate that the UE can transmit the MM message and/or the SM message for no NSSAI because congestion for no NSSAI is solved.

In a case that the running back-off timer is to be extended or reduced, the 11th identification information included in the PDU session modification command may indicate that congestion for the default S-NSSAI has not been solved, may indicate that the UE cannot transmit the MM message and/or the SM message for no NSSAI, or may indicate that the UE cannot transmit the MM message and/or the SM message for no NSSAI because congestion for the default S-NSSAI is not solved. Further, in a case that the running back-off timer is to be extended or reduced, the 11th identification information included in the PDU session modification command may indicate that congestion for no NSSAI has not been solved, or may indicate that the UE cannot transmit the MM message for no NSSAI because congestion for no NSSAI is not solved.

In a case that the running back-off timer is to be stopped, the network need not include the 12th identification information in the PDU session modification command. In contrast, in a case that the running back-off timer is to be extended or reduced, the network may include the 12th identification information indicating a new value in the PDU session modification command.

14th identification information (specific S-NSSAI) included in the PDU session modification command may be the same as the S-NSSAI indicated by the 14th identification information transmitted and/or received in the PDU session establishment accept message of section 3.3. Note that it is preferable that the 14th identification information included in the PDU session modification command be included in the Allowed NSSAI for transmission.

The 10th identification information included in the PDU session modification command may include the 11th identification information to the 18th identification information.

By receiving the PDU session modification command from the SMF via the AMF and the access network (S900 of FIG. 8), the UE may be able to comprehend significance of each piece of identification information included in the PDU session modification command, and/or significance indicated by combining each piece of identification information.

Further, by receiving the PDU session modification command from the SMF via the AMF and the access network, the UE may delete stored information. Further, by receiving the PDU session modification command from the AMF via the access network, the UE may store each piece of identification information included in the PDU session modification command.

Further, the UE may initiate the PDU session establishment procedure, based on reception of the PDU session modification command. More specifically, the UE may initiate the PDU session establishment procedure, based on reception of the PDU session modification command including information indicating that the PDU session establishment procedure is requested to be performed.

By transmitting and/or receiving the PDU session modification command via the access network while having the back-off timer run, the UE and the core network apparatus (for example, the SMF) can extend or reduce or stop the back-off timer before expiration of the back-off timer.

Specifically, the UE may stop the running back-off timer, based on reception of the PDU session modification command not including the 12th identification information. In contrast, the UE may stop the running back-off timer, may start the back-off timer with the 12th identification information, or may perform the both, based on reception of the PDU session modification command including the 12th identification information.

In a case that the UE stops the back-off timer, the UE may transmit the MM message and/or the SM message for a specific network slice. For example, the PDU session establishment request message including the same S-NSSAI as the 10th identification information (S-NSSAI) or the 14th identification information included in the PDU session establishment request message of section 3.3 may be transmitted.

In a case that the UE extends or reduces the back-off timer, the UE cannot transmit the SM message for the specific network slice while the back-off timer is running; however, in a case that the back-off timer expires, or the UE stops the back-off timer using the present procedure, as described in the above, the UE may transmit the MM message and/or the SM message for the specific network slice.

Note that the 12th identification information included in the PDU session modification command may be associated with the 1st identification information included in the PDU session establishment request message.

The 12th identification information included in the PDU session modification command may be associated with the 10th identification information, the 14th identification information, and the 15th identification information included in the PDU session establishment accept message.

The 12th identification information included in the PDU session modification command may be associated with the 1st identification information included in the PDU session establishment request message, and may be associated with the 10th identification information, the 14th identification information, and the 15th identification information included in the PDU session establishment accept message.

The 12th identification information included in the PDU session modification command may be associated with the 1st identification information and the 5th identification information included in the PDU session establishment request message.

The 12th identification information included in the PDU session modification command may be associated with the 5th identification information included in the PDU session establishment request message, and the 10th identification information and/or the 14th identification information and/or the 15th identification information included in the PDU session establishment accept message.

The 12th identification information included in the PDU session modification command may be associated with the 1st identification information and the 5th identification information included in the PDU session establishment request message, and the 10th identification information and/or the 14th identification information and/or the 15th identification information included in the PDU session establishment accept message.

Each apparatus including the UE can change the back-off timer value and the QoS applied to the PDU session by transmitting and/or receiving the PDU session modification command including at least a part of the 10th identification information to the 18th identification information.

In a case that each apparatus including the UE stops the back-off timer, each apparatus including the UE may configure the data rate applied to the PDU session to the data rate indicated by the 17th identification information included in the PDU session establishment accept message.

In a case that each apparatus including the UE stops the back-off timer, in a case that the 17th identification information is included in the PDU session modification command, each apparatus including the UE may configure the data rate applied to the PDU session to the data rate indicated by the 17th identification information included in the PDU session modification command.

Each apparatus including the UE may be in a state of having successfully established a PDU session for a specific network slice after stopping the back-off timer. In other words, here, the condition of the PDU session established for a specific network slice may have been canceled.

After stopping the back-off timer, each apparatus including the UE may be in a state of being capable of transmitting the MM message and/or the SM message for a specific network slice.

In a case that each apparatus including the UE extends or reduces the back-off timer, each apparatus including the UE may configure the data rate applied to the PDU session to the data rate indicated by the 18th identification information included in the PDU session modification command.

In a case that each apparatus including the UE extends or reduces the back-off timer, each apparatus including the UE may update the running back-off timer to the back-off timer value indicated by the 12th identification information included in the PDU session modification command.

In a case that each apparatus including the UE extends or reduces the back-off timer, each apparatus including the UE may be in a state of not being capable of transmitting the MM message and/or the SM message for a specific network slice.

Further, the behavior of each apparatus including the UE in a case that the back-off timer expires may be the behavior similar to that in a case that the back-off timer stops.

As described above, the present section describes the update procedure in which, by performing the PDU session establishment procedure described in section 3.3, each apparatus including the UE establishes a PDU session but the back-off timer and restricted QoS (for example, low data rate) are configured, and for extending or reducing or stopping the back-off timer before expiration of the back-off timer, and changing restricted QoS.

Note that, with the update procedure being performed one or more times, the back-off timer and the QoS can be changed one or more times.

4. Modified Examples

A program running on an apparatus according to the present invention may serve as a program that controls a Central Processing Unit (CPU) and the like to cause a computer to operate in such a manner as to realize the functions of the aforementioned embodiment according to the present invention. Programs or information handled by the programs are temporarily stored in a volatile memory such as a Random Access Memory (RAM), a non-volatile memory such as a flash memory, a Hard Disk Drive (HDD), or another storage device system.

Note that a program for realizing the functions of the embodiments according to the present invention may be recorded on a computer-readable recording medium. The functions may be realized by causing a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, a medium dynamically retaining the program for a short time, or any other computer readable recording medium.

Furthermore, each functional block or various features of the apparatuses used in the aforementioned embodiment may be implemented or performed on an electric circuit, for example, an integrated circuit or multiple integrated circuits. An electric circuit designed to perform the functions described in the present specification may include a general purpose processor, a digital signal processor (DSP), an application specific integrated circuit (ASIC), a field programmable gate array (FPGA), or other programmable logic devices, discrete gates or transistor logic, discrete hardware components, or a combination thereof. The general-purpose processor may be a microprocessor, or may be a processor of a known type, a controller, a micro-controller, or a state machine instead. The aforementioned electric circuit may include a digital circuit or may include an analog circuit. In a case that with advances in semiconductor technology, a circuit integration technology appears that replaces the present integrated circuits, one or multiple aspects of the present invention are also possible to use a new integrated circuit based on the technology.

Note that the invention of the present application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

Although, the embodiments of the present invention have been described in detail above referring to the drawings, the specific configuration is not limited to the embodiments and includes, for example, design changes within the scope not depart from the gist of the present invention. Furthermore, in the present invention, various modifications are possible within the scope of claims, and embodiments that are made by suitably combining technical means disclosed according to the different embodiments are also included in the technical scope of the present invention. Furthermore, a configuration in which elements described in the respective embodiments and having mutually the same effects, are substituted for one another is also included.

REFERENCE SIGNS LIST

1 Mobile communication system
10 UE #A
30 PGW-U
32 PGW-C
35 SGW
40 MME
45 eNB
50 HSS
60 PCRF
80 Access network #A (E-UTRAN)
90 Core network #A
120 Access network #B (5G AN)
122 gNB
130 UPF
132 SMF
140 AMF
150 UDM
160 PCF
190 Core network #B

The invention claimed is:

1. A User Equipment (UE) comprising:
control circuitry; and
transmission and reception circuitry;
wherein
the transmission and reception circuitry is configured to receive, from an Access and Mobility Management Function (AMF), a first configuration update command message including a rejected Network Slice Selection Assistance Information (NSSAI) including a Single Network Slice Selection Assistance Information (S-NSSAI) for which a maximum number of UEs has been reached, a cause value indicating that the S-NSSAI is not available due to the maximum number of UEs being reached, and a back-off timer value for the S-NSSAI,
the control circuitry is configured to start a timer with the back-off timer value for the S-NSSAI, and
the transmission and reception circuitry is further configured not to attempt to use the S-NSSAI while the back-off timer is running.

2. The UE according to claim 1, wherein the transmission and reception circuitry is further configured to receive the S-NSSAI included in an allowed NSSAI in a registration accept message or a second configuration update command message before reaching the maximum number of UEs for the S-NSSAI.

\* \* \* \* \*